Nov. 13, 1962 R. P. CUMMINGS 3,063,347
CUP MAKING MACHINE
Filed March 31, 1960 14 Sheets-Sheet 1

INVENTOR.
Raymond P. Cummings
BY
Curtis, Morris & Safford
ATTORNEYS

Nov. 13, 1962 R. P. CUMMINGS 3,063,347
CUP MAKING MACHINE
Filed March 31, 1960 14 Sheets-Sheet 2

INVENTOR
Raymond P. Cummings
BY
Curtis, Morris & Safford
ATTORNEYS

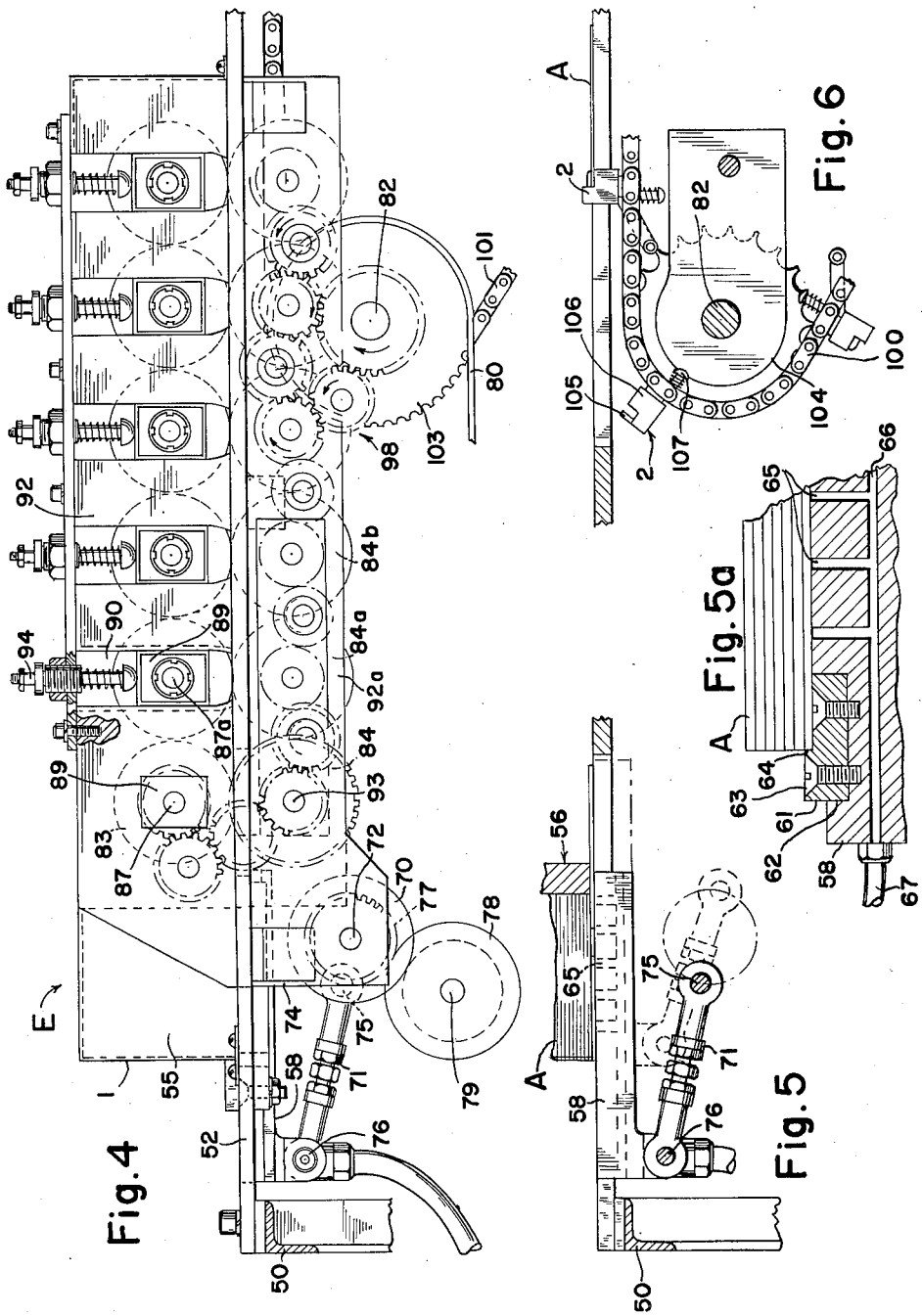

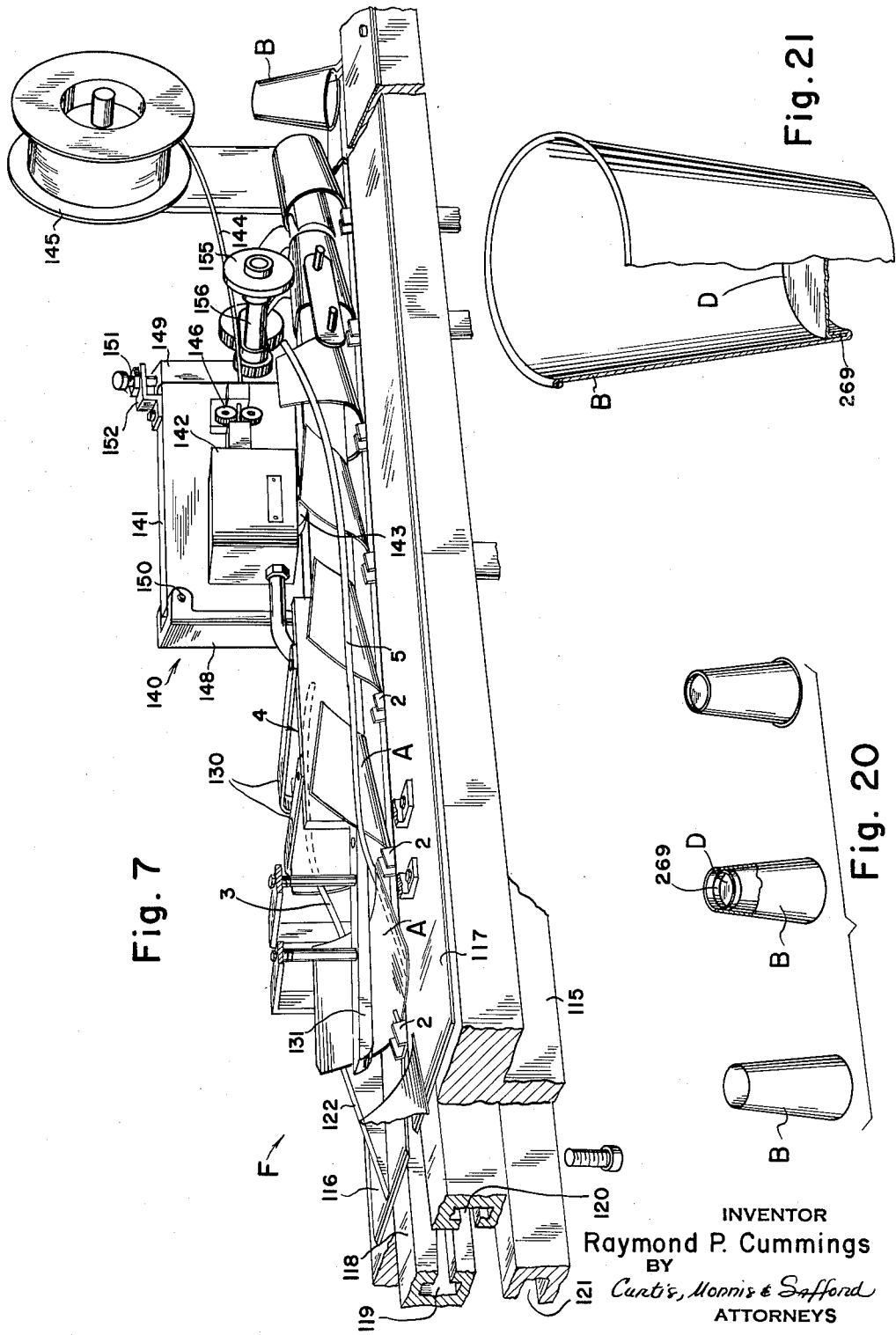

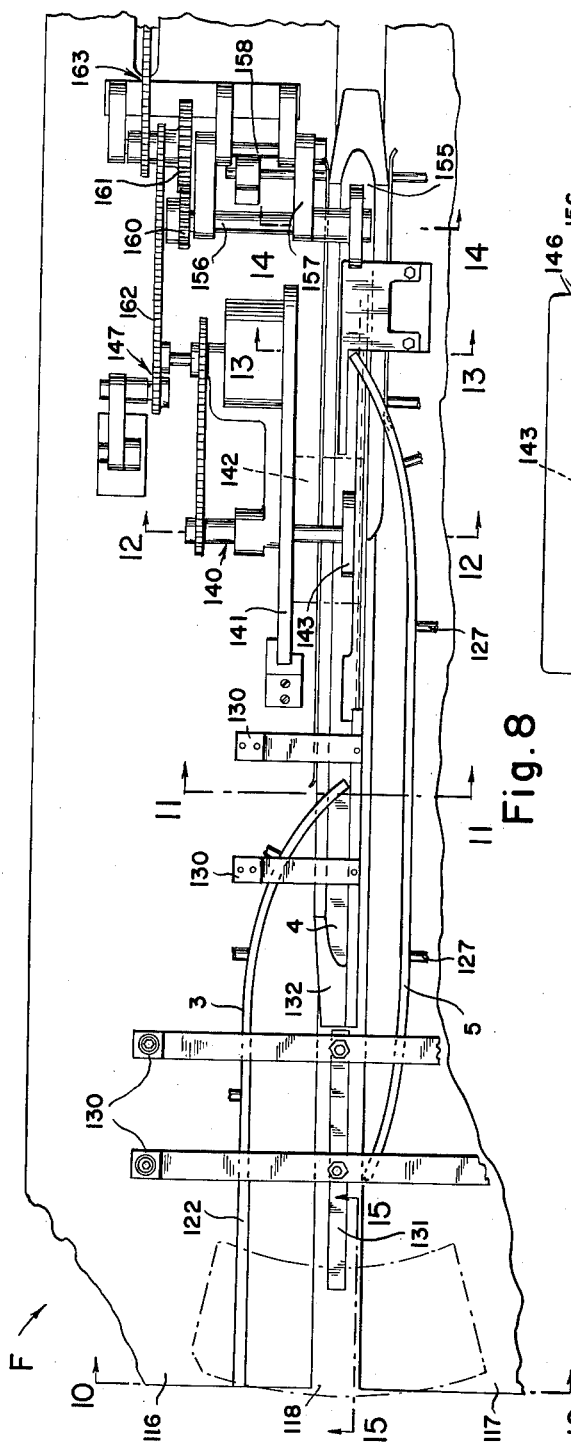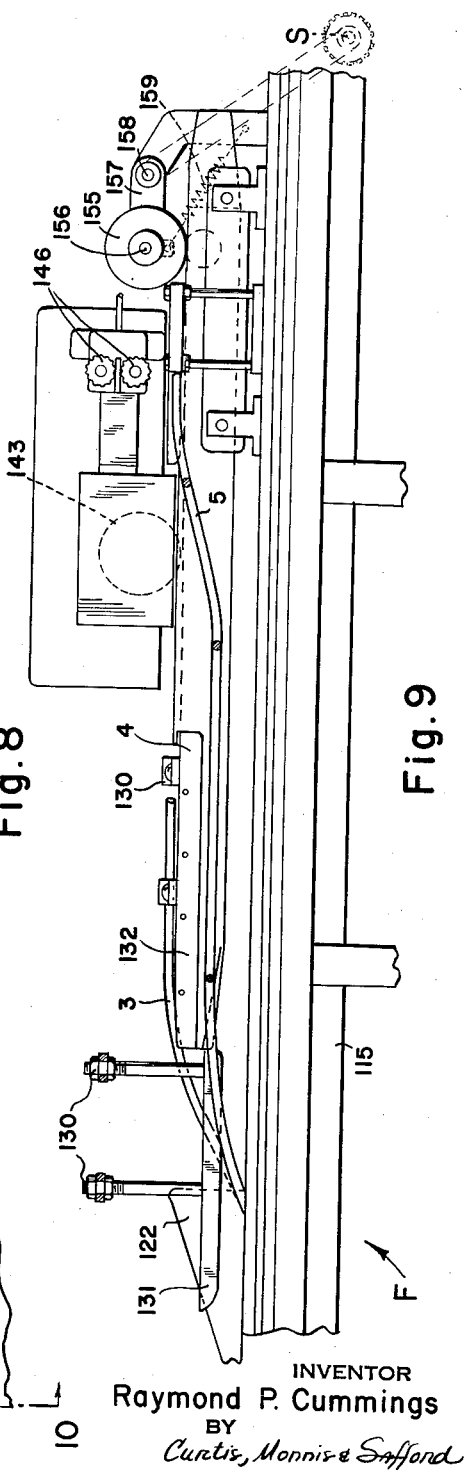

Nov. 13, 1962 R. P. CUMMINGS 3,063,347
CUP MAKING MACHINE
Filed March 31, 1960 14 Sheets-Sheet 6

INVENTOR
Raymond P. Cummings
BY
Curtis, Morris & Safford
ATTORNEYS

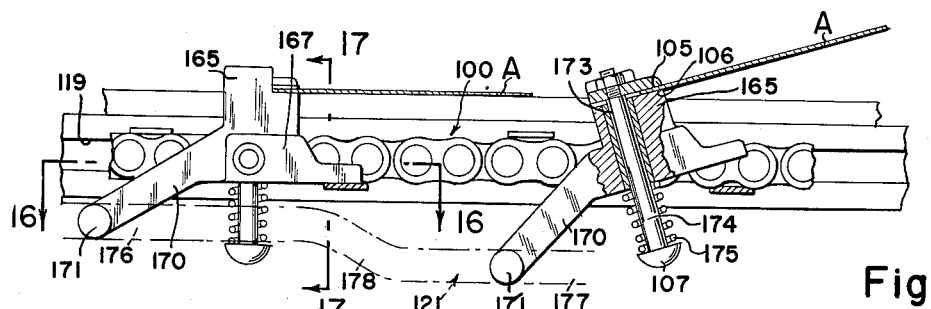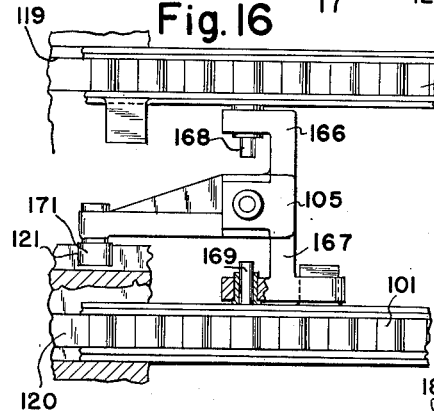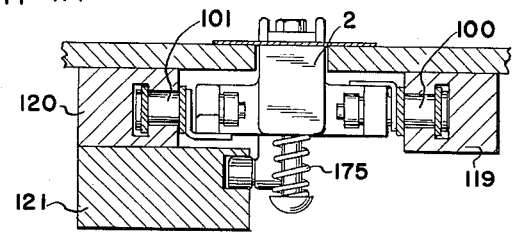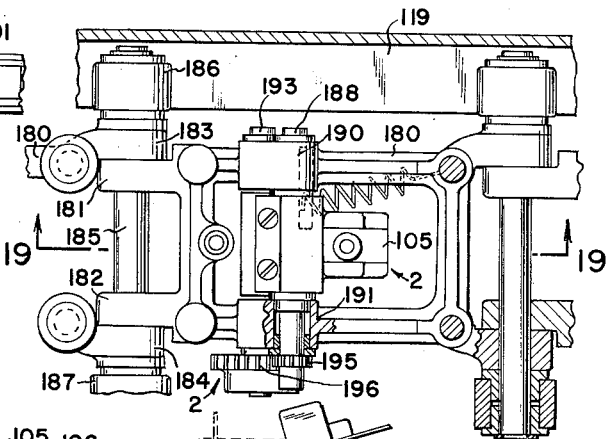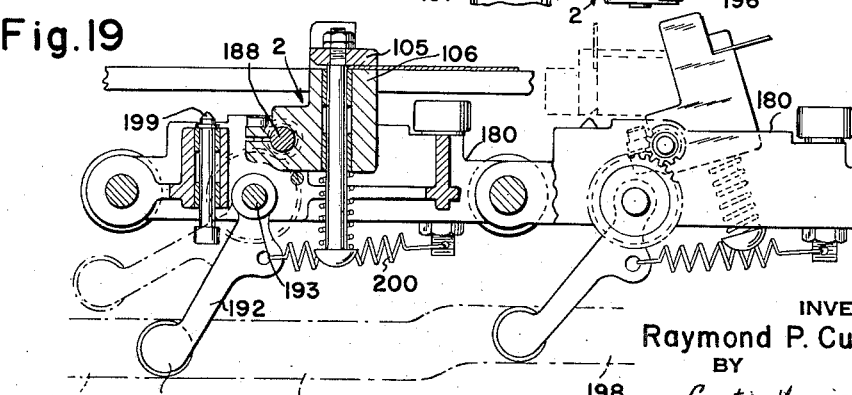

Nov. 13, 1962  R. P. CUMMINGS  3,063,347
CUP MAKING MACHINE
Filed March 31, 1960  14 Sheets-Sheet 8

INVENTOR.
Raymond P. Cummings
BY Curtis, Morris & Safford
ATTORNEYS

Nov. 13, 1962 R. P. CUMMINGS 3,063,347
CUP MAKING MACHINE
Filed March 31, 1960 14 Sheets-Sheet 9

INVENTOR.
Raymond P. Cummings
BY
Curtis, Morris & Safford
ATTORNEYS

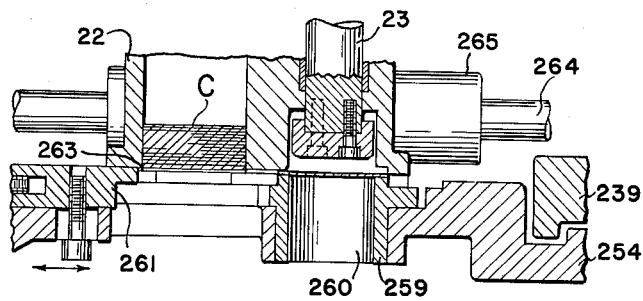
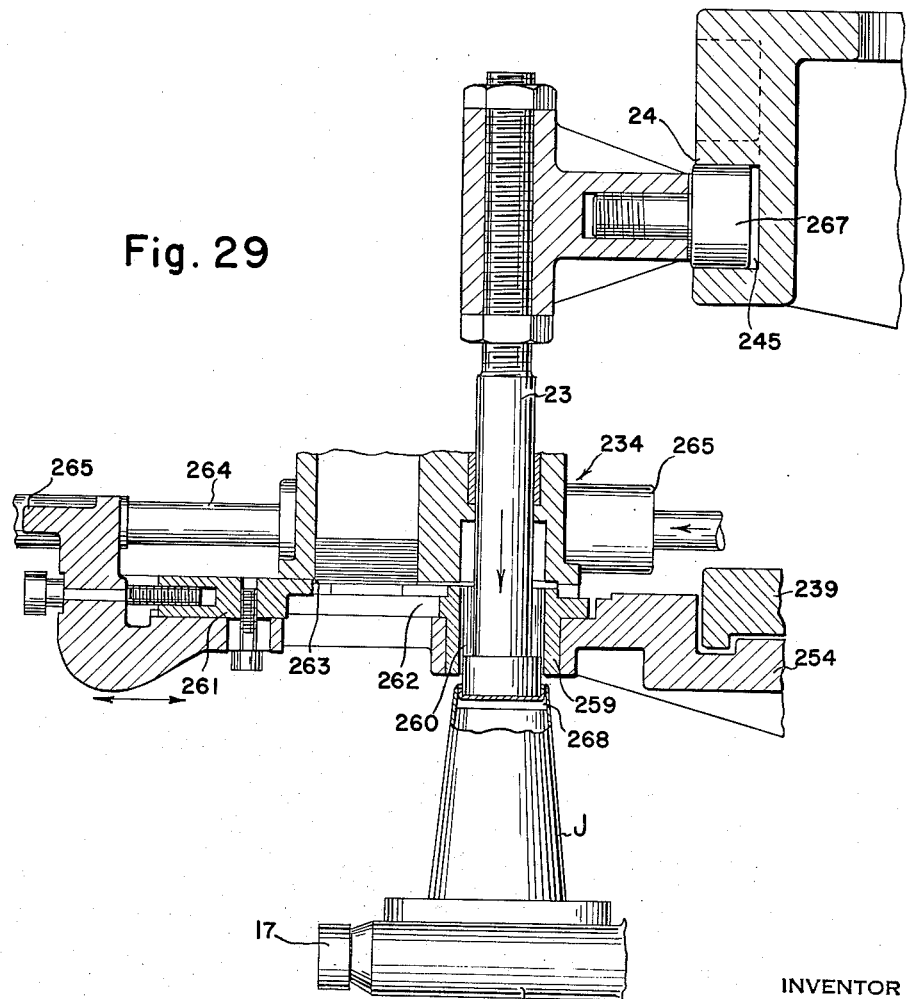

Nov. 13, 1962  R. P. CUMMINGS  3,063,347
CUP MAKING MACHINE
Filed March 31, 1960  14 Sheets-Sheet 12

INVENTOR
Raymond P. Cummings
BY
Curtis, Morris & Safford
ATTORNEYS

Nov. 13, 1962   R. P. CUMMINGS   3,063,347
CUP MAKING MACHINE

Filed March 31, 1960   14 Sheets-Sheet 13

INVENTOR
Raymond P. Cummings
BY
Curtis, Morris & Safford
ATTORNEYS

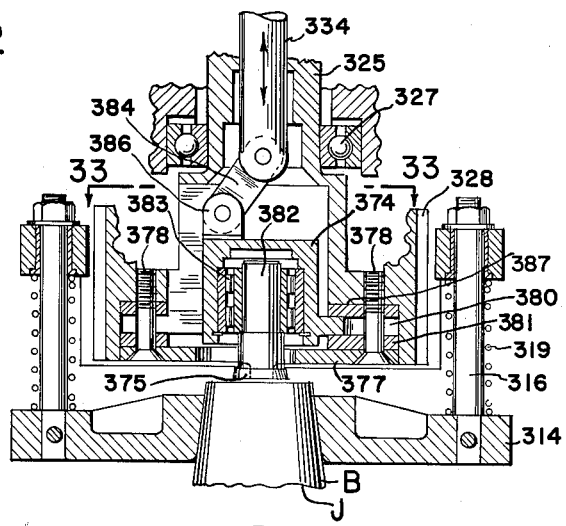
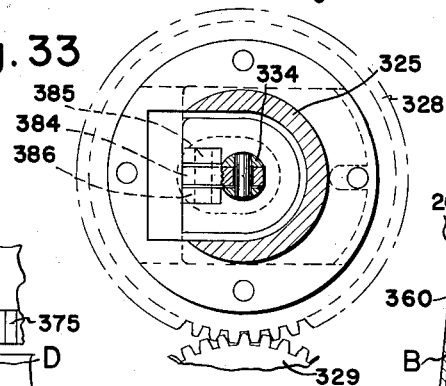
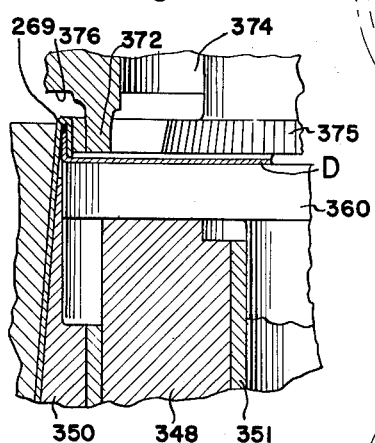
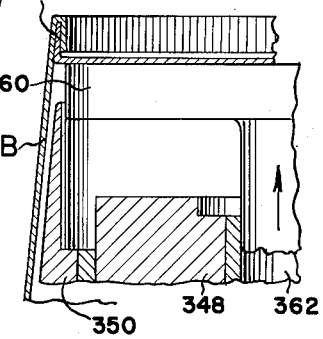
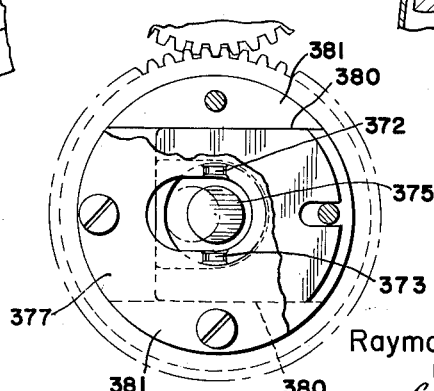

United States Patent Office 3,063,347
Patented Nov. 13, 1962

3,063,347
CUP MAKING MACHINE
Raymond Patrick Cummings, Spotswood, N.J., assignor to Hudson Pulp & Paper Corp., New York, N.Y., a corporation of Maine
Filed Mar. 31, 1960, Ser. No. 18,960
54 Claims. (Cl. 93—39.3)

The present invention relates to cup making apparatus and more particularly to apparatus for making paper cups at a high production rate.

Many different type cup making machines have heretofore been proposed, but in practically all of the machines used in the commerical manufacture of frusto-conical paper cups having a bottom insert, a cup blank is wound around or within a rotary mandrel to form the cup body. While such machines operate satisfactorily they are inherently intermittent in operation. In these commercial machines a blank is advanced to a forming mandrel and its forward motion stopped while the mandrel or blank is rotated to form the cup body. After the cup body has been formed it is advanced and/or indexed to another station and dwells while another operation is performed. During each of the steps of making a cup, such as applying a separate bottom closure insert to the formed body, crimping the bottom closure element to the body and knurling the crimped edge of the bottom, the forward motion of the cup is stopped. For example, in one known type of cup making machine, a turret mounts a plurality of rotatable mandrels and the turret is indexed intermittently to move each cup blank through successive stations where successive cup forming operations are performed.

The intermittent operation of these prior machines and the necessity of translating the linear motion of a cup blank to a rotary motion and then back to a linear motion limits the speed at which a cup blank can be moved through the machine. As a result, the cup production in such machines is limited by the time required to start and stop the forward motion of the cup blank.

One of the objects of the present invention is to provide a cup making apparatus in which blanks move through the apparatus at a constant velocity while they are being formed into finished cups.

Another object is to provide an apparatus of the type indicated which produces finished cups at a production rate limited only by the velocity limitations of the components of such apparatus to move the blanks in a linear path.

Another object is to provide a cup making apparatus in which the cup forming operations are performed automatically during the continuous movement of the blank through the apparatus.

Another object is to provide a cup making machine of the type indicated in which successive cup forming operations are performed by mechanisms which move at the same velocity and in juxtaposed relation to the blanks.

Another object is to provide an apparatus of the type indicated which utilizes a single finishing unit to fabricate cubs from cup bodies supplied thereto in separate lines from a plurality of body forming units.

Another object is to provide a cup body forming unit which folds a flat blank to frusto-conical form as the blank moves in a linear path through the unit at a constant velocity.

Another object is to provide a cup body forming unit which tilts the blanks at an angle to its linear path of movement as it is folded to frusto-conical form to provide a horizontal seam of the overlapping edge portions.

Another object is to provide apparatus of the type indicated which transfers formed cup bodies from a body forming unit to a finishing unit without changing its velocity.

Another object is to provide bottom forming mechanisms which move in a continuous endless path juxtaposed to a portion of a path of supporting mandrels on which cup bodies are to be mounted.

Another object is to form cup bottom inserts from blanks of flat stock while moving through a path converging with the path in which the formed cup bodies move and at the same velocity.

Another object is to provide a cup finishing unit with tooling mechanisms which move at a constant velocity in an endless path juxtaposed to portions of the path of movement of the cups being formed.

Another object is to provide a combined crimping, knurling and/or heating unit for attaching bottom inserts to successive formed bodies as they are in juxtaposed relationship to the mandrels at the same velocity.

Another object is to provide an apparatus of the type indicated having a doffing mechanism for removing finished cups from the mandrels as they move at constant velocity.

Still another object is to provide a cup making apparatus of the type indicated which is reliable in operation to produce frusto-conical cups at a high rate of production.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 4 is a side elevational view of the blank feeding unit showing the reciprocating shuttle for picking successive blanks from the bottom of a magazine and advancing them through a gate into feed rolls;

FIGURE 5 is a sectional view taken on line 5—5 of FIGURE 3 to show the relation of the shuttle to the magazine and blanks to be fed;

FIGURE 5a is an enlarged sectional view longitudinally through the shuttle to show the detailed construction of the shuttle for picking blanks from the bottom of the magazine;

FIGURE 6 is a partial sectional view of the conveyor chain at the right hand end of the blank feeding unit in FIGURE 4 and showing the grippers mounted on the conveyor chain and the cam for operating the grippers;

FIGURE 7 is a perspective view of a cup body forming unit and showing the successive blanks in different stages of folding and forming as they move through the unit;

FIGURE 8 is a plan view of the cup-body forming unit and showing the folding guides, anvil, side seam adhesive applying wheel, and nip roll for pressing the seam;

FIGURE 9 is a side elevational view of the body forming unit illustrated in FIGURE 8;

FIGURE 15 is a longitudinal sectional view taken on line 15—15 of FIGURE 8 to show successive grippers on the conveyor chain and the cam track for rocking the gripper and blank carried thereby at an angle to the horizontal;

FIGURE 16 is a sectional plan view taken on line 16—16 of FIGURE 15 to show the pivotal mounting for the grippers to adapt them for rocking movement between spaced chains;

FIGURE 17 is a transverse sectional view taken on line 17—17 of FIGURE 15 to show the chains mounted in guide tracks and the cam arm depending from each gripper and engaging the cam track;

FIGURE 18 is a plan view similar to FIGURE 16 showing a gripper of modified construction;

FIGURE 19 is a longitudinal sectional view taken on line 19—19 of FIGURE 18 to show the relationship of the parts and the gearing for rocking the gripper to different angular positions during its movement through the body forming unit;

FIGURE 20 is a view showing the successive steps in assemblying a cup body and bottom insert to form a finished cup;

FIGURE 21 is an enlarged perspective view of a finished cup partly in section;

FIGURE 28 is an enlarged view of the blank feeder for feeding blanks to the bottom insert forming plunger;

FIGURE 29 is an enlarged transverse sectional view showing the bottom insert forming plunger operated vertically;

FIGURE 32 is a further enlarged sectional view of the lower portion of the crimping, knurling, and/or heating head and showing the mechanism for pressing the crimping and knurling tools axially of the mandrel to attach the cup body to the bottom insert;

FIGURE 33 is a transverse sectional view taken on line 33—33 of FIGURE 32 to show the push rod and link for sliding the crimping and knurling head as it rotates;

FIGURE 34 is a bottom plan view of the crimping and knurling head partly in section to show the slot in the bottom plate in which the knurling tool moves laterally;

FIGURE 35 is an enlarged sectional view of a portion of the crimping and knurling head depressed relative to the mandrel to crimp the end of the cup body over the flange of the bottom insert and knurl the crimped end; and FIGURE 36 is a sectional view through the mandrel and cup showing the knurled flange of the cup and the cup being released from the mandrel.

CUP MAKING APPARATUS IN GENERAL

Figure 1:
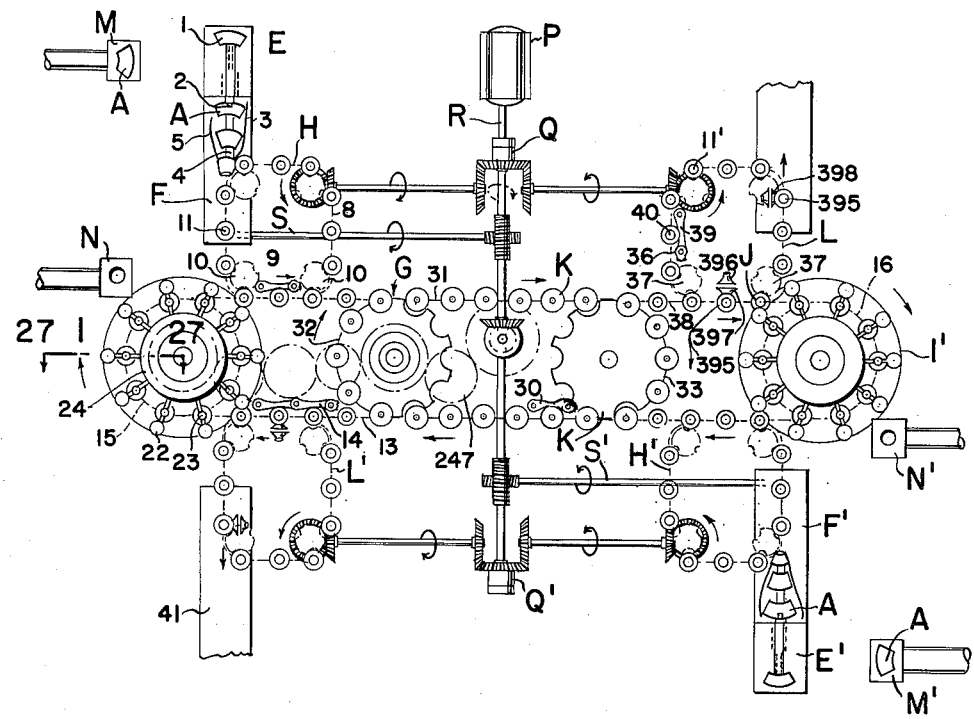
FIGURE 1 is a schematic plan view of the complete apparatus incorporating the novel features of the present invention and showing the arrangement of the single finishing unit for completing the manufacture of cups from cup bodies supplied from separate body forming units.

The complete cup making apparatus of the present invention is illustrated diagrammatically in FIGURE 1 as comprising a plurality of units which cooperate to automatically feed, form and assemble blanks into finished cups as the blanks move continuously at constant velocity through the successive units.

While the apparatus of the present invention may include only a single line of body forming blanks A and bottom forming blanks C, the apparatus is particularly adapted to feed body forming blanks A in separate lines and deliver formed bodies B to a finishing unit adjacent each end. The finising unit forms bottom blanks C at opposite ends into bottom inserts D and applies and attaches the bottom inserts to formed cup bodies at its opposite sides.

Figure 2:
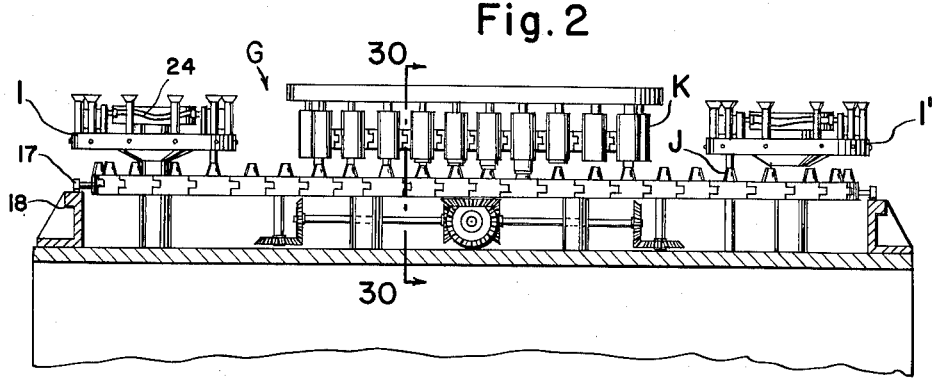
FIGURE 2 is a side elevational view of the cup finishing unit illustrated in FIGURE 1.

The apparatus illustrated in FIGURES 1 and 2 of the drawings comprises a pair of blank feeding units E and E' and a pair of body forming units F and F' for forming successive frusto-conical cup bodies B in separate lines. The formed cup bodies B from the separate lines are transferred to opposite sides of a finishing unit G adjacent its opposite ends by a pair of transfer units H and H'. The finishing unit G, in turn, has turrets I and I' at its opposite ends which forms circular cup bottom blanks C into bottom inserts D and applies an insert to the top of each successive mandrel J moving along each end of the unit before the cup bodies B are transferred thereto at the sides. The finishing unt also mounts a plurality of crimping, knurling and/or heating heads K which crimp the end of the body B to the bottom insert D on each mandrel J and knurls the crimped end. As shown most clearly in FIGURE 2, the bottom blank forming turrets I and I' overlie the mandrels J in juxtaposed relation and the crimping and knurling heads K also overlie the mandrels in juxtaposed relation. Doffing units L and L' are provided at the ends of the finishing unit G opposite the transfer units H and H' for doffing the finished cups from the mandrels J. A pair of blanking cutters M and M' for cutting body blanks A from continuous webs are positioned adjacent the blank feeding units E and E' to provide a supply of body blanks and a pair of blanking cutters N and N' for cutting bottom blanks C are positioned adjacent the turrets I and I' to provide a supply of bottom blanks.

The blanks A and C when once started through the apparatus are maintained at the same constant linear velocity as they move through the units successively. To maintain the simultaneous movement of the blanks A and C as they are formed into cup bodies B and bottom inserts D and joined to form finished cups, the successive units are driven synchronously. This may be accomplished by separate drives, but preferably all of the units are driven from the same prime mover P at the same speed by a suitable driving means indicated diagrammatically in FIGURE 1.

If, at any time, a component of a blank F' or doffing unit L or L' at one side of the machine becomes inoperative, they may be disconnected and the apparatus continued in operation to make cups at the opposite side of the machine. For this purpose, suitable magnetic clutches Q and Q' are provided to connect and disconnect the units from the main power shaft R. Thus, the only time that the entire apparatus needs to be shut down is when a failure occurs in the finishing unit G or power source P. The blanks may be of the proper size and dimension to produce a cup body B of any diameter and depth with a wall at any desired thickness and angle to the axis of the frusto-conical cup body.

The blanks A are stacked in a magazine 2 in each blank feeding unit E and E' and the blanks are fed successively from the bottom of the magazine. The blanks A may be transferred from the blanking cutters M and M' to the magazine 1 of the feeding units E and E' automatically as, for example, by superimposing the blanking cutter over the magazine, or the blanks may, be transferred manually. Blanks A advanced by each blank feeding unit E or E' are captured by successive grippers 2 which move the blanks through a body forming unit F or F' continuously at the same constant velocity.

During the travel of the blanks A in a linear path through its body forming unit F or F', a stationary guide 3 folds one side of each blank A over an anvil 4 where adhesive is applied to its edge. A second stationary guide 5 then folds the other side of the blank into overlapping relationship to the first folded edge and the overlapping edges are adhesively secured to complete the formation of a cup body B. The grippers 2 rock the blank at an angle to the horizontal during travel through the body forming unit F or F' to position the seam of the overlapping edges in a horizontal plane when they are adhesively attached. After the cup body B has been formed the gripper 2 may further rock and the body to an upright position to facilitate removal from the unit. Thus, a cup body B is formed from a blank A as the latter moves at a constant velocity in a linear path through a body forming unit F or F' and the cup bodies may be successively fabricated at a rate dependent only upon the velocity at which blanks may move through the unit.

The formed cup bodies B are transferred from each body forming unit F or F' to the finishing unit G by the transfer units H and H' as fast as they are formed. Each transfer unit H and H' comprises a continuous conveyor chain 8 of successive links 9 mounted on sprockets 10. The sprockets 10 are so arranged as to cause the chain 8 to move in a rectangular path having one side adjacent to and parallel with the linear path of cup blanks A and formed cup bodies B and another side adjacent to and parallel with the finishing unit G. Each link of the conveyor chain 8 mounts a vertically movable push rod 11 and each push rod mounts fingers at the lower end of which are adapted to spread and collapse to grip and release the cup body. The chain 8 of each transfer unit H and H' is driven to move a link 9 at the same velocity and in juxtaposed relation to a formed cup body B advanced by a gripper 2 on the body forming units F and F'. As a link of the conveyor chain 8 moves along a body forming unit F or F' push rod 11 is moved vertically into the cup body where the fingers are expanded to grip and secure the cup body. After the cup body B has been captured by the fingers, the gripper 2 releases the cup body 10 which is then transferred to the finishing unit G. The spacing of links 9 on conveyor 8 are equal to the spacing of grippers 2 so as to capture each cup body B formed on a body forming unit F or F' and deliver it to the finishing unit G as later explained. Thus, the transfer units H and H' move the cup bodies B continuously at the same velocity that the blanks A move through the body forming units F and F'.

The finishing unit G also comprises a conveyor chain 13 of successive links 14 mounted on sprockets 15 and 16 at opposite ends of the unit for movement in a horizontal plane. Each link 14 mounts a supporting mandrel J onto which the formed cup bodies B are placed by the transfer units H and H'. Each mandrel J and supporting structure has a roller 17 at its outer end which bear on a track 18 to support the mandrel and chain between the sprockets 15 and 16.

The turrets I and I' at opposite ends of the finishing unit G and overlying the conveyor chain 13 are driven by a gear train from power source P. Arranged around the periphery of each turret I and I' are a plurality of magazines 22 each holding a supply of bottom blanks C and a forming punch 23 for each magazine 22 and the forming punches are so spaced that a punch overlies a mandrel J during their concurrent movement at the same velocity. Bottom blanks C are fed from each magazine 22 to underlie a forming punch 23 during a predetermined angular movement of the turret I or I' and its corresponding forming punch 23 actuated vertically during another angular movement of the turret to form a circular bottom insert, with an upwardly projecting peripheral flange and deliver it onto the top of the underlying mandrel J. A stationary cam 24 is located at the center of each turret I and I' and has tracks for actuating the blank feeder and forming punch 23 during rotation of the turret. Thus, the movement of each punch 23 through a forming die applies a bottom insert D to each mandrel J as it moves in a circular path around each end of the finishing unit G.

As each mandrel J with a cup bottom insert D mounted at its upper end moves from the sprocket 15 or 16 in a linear path at opposite sides of finishing unit G, the transfer unit H and H' mount a formed cup body B over the mandrel and bottom insert. The construction is such that the circular end of the cup body B projects upwardly beyond the projecting flange of the bottom insert D. The conveyor chain 13 of the finishing unit 11 moves at the same linear velocity as the conveyor chain 8 of the transfer units H and H' so that the bottom insert D and cup body B move at the same velocity as they are placed one over the other on the mandrels J and then continue to move in a linear path at the same velocity.

The end of the wall of the cup body B is joined to the flange of the bottom insert D by the crimping, knurling and/or heating mechanism K on the finishing unit G. The crimping and knurling mechanism K comprises a plurality of heads mounted on successive links 30 of a conveyor chain 31. Conveyor chain 31 is mounted on sprockets 32 and 33 located inwardly from sprockets 15 and 16 for the conveyor chain 13 mounting mandrels J and the conveyor chain 31 overlies portions of the conveyor 13 at the opposite sides of the finishing unit G. The individual links of the chains 13 and 31 are of the same pitch and the chains are driven at the same velocity so that a crimping and knurling head K on each link 30 of chain 31 will overlie a mandrel J on each link 14 of chain 13. Each head of the crimping, knurling and heating mechanisms mounts a rotating crimping tool which bears against the upwardly projecting end of the cup body B and rolls it downwardly over the flange of the bottom insert D. After the end of the cup body B has been crimped to the flange of the bottom insert D, a knurling tool engages the inside periphery of the crimped edge and knurls the overlapping flanges to seal the joint therebetween. When desired a presser plate may be heated to melt a heat sensitive sealing film on one or both parts to further insure sealing of the joint.

As the mandrels J are moved at a constant velocity with a formed cup thereon they pass beyond the end of the chain 31 of the crimping and knurling mechanism K to doffing units L and L' at each side of finishing unit G and each doffing unit has a conveyor chain 36 similar to the conveyor chains 8 and of the same pitch as that of the transfer units H and H'. The chain 36 of each doffing unit is mounted on sprockets 37 for movement in a rectangular path having one side overlying and juxtaposed to the mandrels J on chain 13. The links 39 of chain 36 are of the same pitch as the links 14 of chain 13 and each link 39 mounts a doffing head 40. The chains 36 and 13 are driven at the same velocity so that a doffing head 40 overlies a mandrel J having a finished cup thereon. Each doffing head 40 may have any suitable means for doffing the formed cup, but preferably the doffing heads comprise cup shaped members subjected to a negative pressure during movement through a portion of their path of movement to remove finished cups from the mandrels J and subjected to positive pressure during movement through another portion of their path of movement to deliver the formed cups into a conveyor chute 41.

It will now be observed from FIGURE 1 that the blank forming unit E and transfer unit F are positioned at one side of finishing unit G to supply formed cup bodies B thereto for movement toward the right, while the units E' and F' are positioned at the opposite side of the finishing unit for movement toward the left. Thus, cups are fabricated at each side of the finishing unit G and utilize the same mandrels J and crimping, knurling and/or heating heads during their movement in closed paths.

*Blank Feeding Unit*

Figure 3:
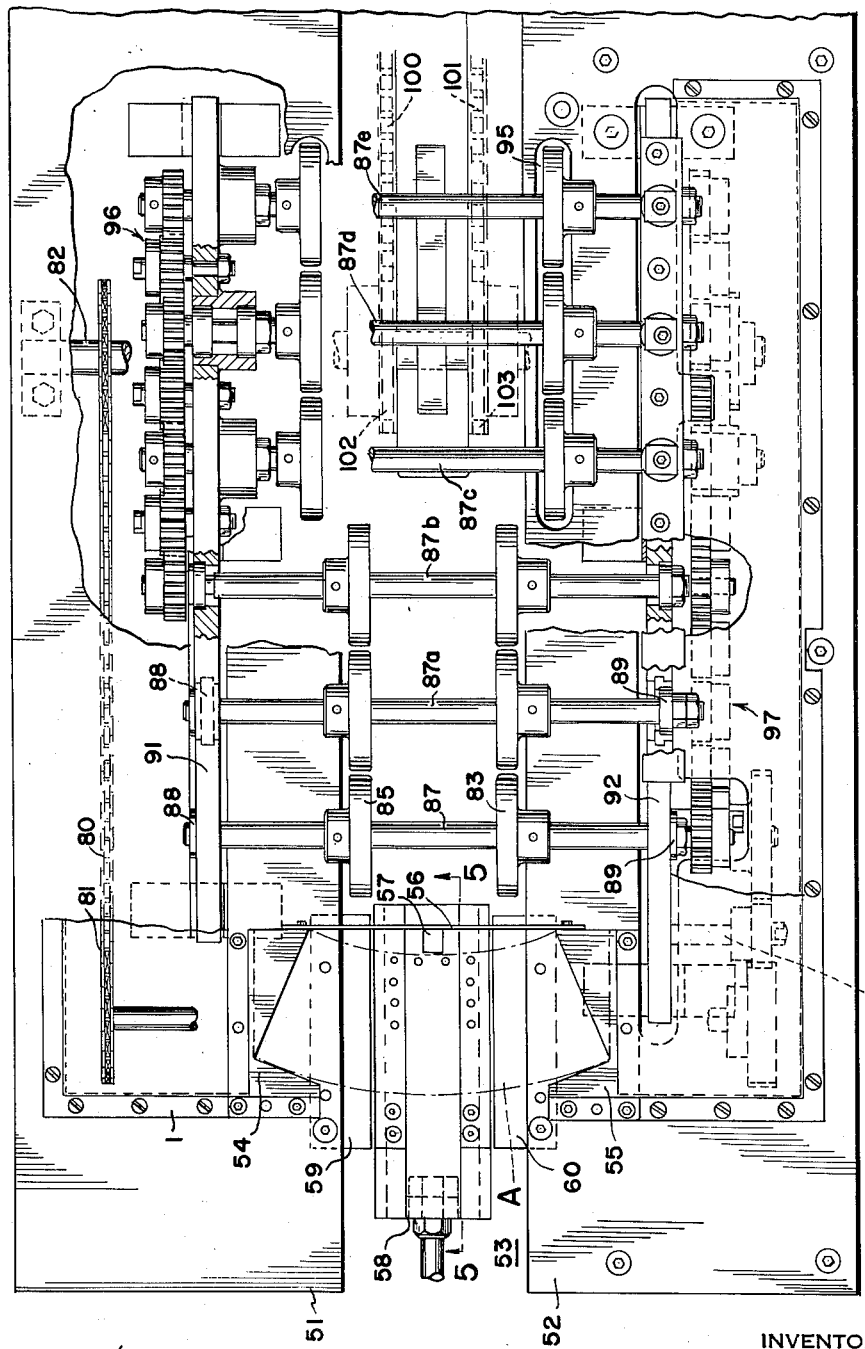
FIGURE 3 is a plan view of a blank feeding unit for advancing body blanks from a magazine successively.
Figure 10:
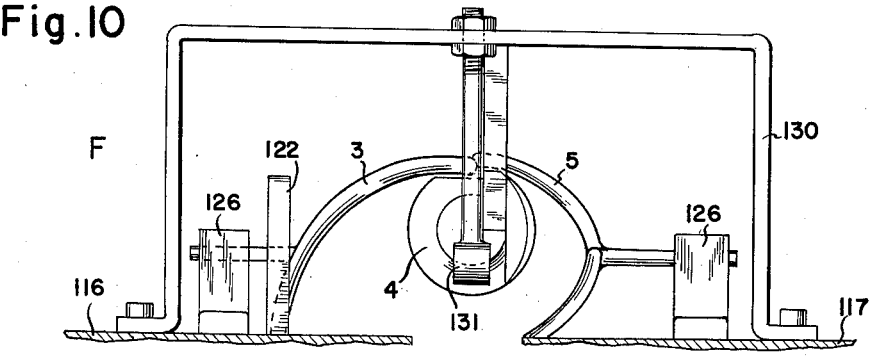
FIGURE 10 is a transverse sectional view taken on line 10—10 of FIGURE 8 to show the inclined track for initiating the fold at one side of the blank and the stationary guide rails.
Figure 11:
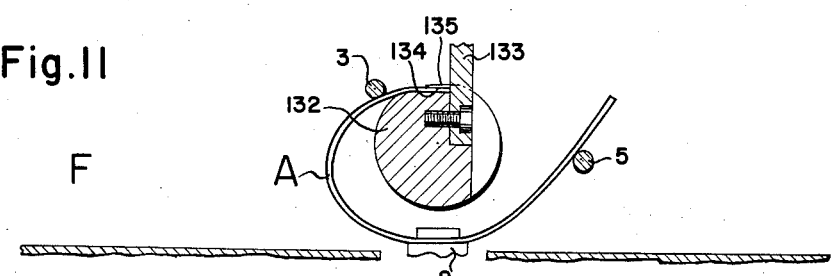
FIGURE 11 is a transverse sectional view taken on line 11—11 of FIGURE 8 and showing one side of the blank folded upwardly and inwardly into a slot in the anvil to engage its edge with a vertical guide.

The blank feeding units E and E' are of identical construction as illustrated in detail in FIGURES 3 to 6 and each comprises a frame 50 for supporting horizontal plates 51 and 52, see FIGURE 3, to form a table top with a space 53 between the plates. The magazine 1 projects upwardly from said table top and comprises spaced side walls 54 and 55 mounted on plates 51 and 52, respectively, and each of the side walls of the magazine are of a shape corresponding to the contour of the sides of the blank A. A number of blanks A are stacked in the magazine 1 and are supported at each side by the underlying plates 51 and 52. The bottom of the side walls 54 and 55 constituting the magazine 1 are spaced from the respective plates 51 and 52 on which they are mounted. A gate opening 56 is provided by the lower end of a narrow depending plate 57 and underlying plates 51 and 52 spaced a distance greater than the thickness of one blank and less than the thickness of two blanks through which only a single blank A can pass, see FIGURE 5.

Successive blanks A are picked from the bottom of a stack in magazine 1 by a reciprocating shuttle 58. As shown in detail in FIGURE 5 and 5a the shuttle 58 comprises a plate mounted to slide between spaced brackets 59 and 60 bolted to plates 51 and 52 and projecting into the opening 53 therebetween. The opposite sides of the shuttle 58 and brackets 59 and 60 have cooperating gibs and gibways to mount the shuttle for reciprocation. The shuttle 58 has its upper face at the level of the plates 51 and 52. A picker element 61 of hardened steel is mounted in a recess 62 in the top face of shuttle 58 by screws 63 and has an upwardly projecting shoulder 64 which projects upwardly from the top face of the shuttle and plates 51 and 52 a distance less than the thickness of a blank A. Thus, when the shuttle 58 moves through a forward stroke the shoulder 64 engages the rearward edge of the lowermost blank A and moves it forwardly through the gate opening 56. The lowermost blank A is held against the top face of the shuttle 58 during a forward stroke by a suction arrangement comprising perforations 65 in the shuttle connected by cores 66 to a flexible suction line 67.

Shuttle 58 is reciprocated by an eccentric 70 and connecting rod 71, see FIGURES 4 and 5. Eccentric 70 is in the form of a disc mounted on a lay shaft 72 journaled in bolsters 73 and 74 depending from the plates 51 and 52 and the disc has an eccentric pin 75 projecting from one side. The connecting rod 71 is connected between the eccentric pin 75 and a wrist pin 76 in a clevice depending from the shuttle 58. Shaft 72 has a driven gear 77 fast thereon which meshes with a driving gear 78 on a drive shaft 79. Drive shaft 79, in turn, is driven by a chain 80 and sprocket 81 from a drive shaft 82 at the opposite end of the unit. Thus, when the shuttle 58 is reciprocated it feeds a blank 8 from the bottom of the magazine 5.

The blanks A advanced successively by the shuttle 58 are caught between the bite of a lateral series of spaced pairs of opposed feed rolls 83, 84 and 85, 86. There are three sets of such feed rolls positioned one after the other in succession and a second group of three sets of laterally spaced pairs of opposed feed rolls positioned successively beyond the first set. A description of one set of feed rolls will suffice for the others as they are identical. Upper feed rolls 83 and 85 are mounted on a shaft 87 journaled in bearing blocks 88 and 89. The bearing blocks 88 and 89 are slidably mounted in ways 90 in bolsters 91 and 92 projecting perpendicular to the plates 51 and 52. The lower feed rolls 84 and 86 are mounted on a shaft 93 journaled in bearings in the bolsters 91a and 92a depending from the plates 51 and 52, see FIGURE 4. The upper feed rolls 83 and 85 are positioned in the space 53 between the plates 51 and 52 and overlie the feed rolls 84 and 86. The upper feed rolls 83 and 85 are yieldingly engaged with the lower feed rolls 84 and 86 by spring pressed plungers 94 acting between the bolsters 91 and 92 and top of the bearing blocks 88 and 89. The opposed feed rolls 83, 85 and 84, 86 of the second set are identical with the first set except that the feed rolls are spaced further apart on the shafts on which they are mounted and engage each other in slots 95 in the top plates 51 and 52. The lower rolls 85 and 86 are mounted on stub shafts to provide a space therebtween for the grippers 2, later described in detail.

The shafts 87 and 93 mounting the opposed feed rolls 83, 84 and 85, 86 of successive sets are driven in synchronism from the drive shaft 82 which, in turn, is driven by chains 100 and 101 and sprockets 102 and 103, later to be described in detail. To this end, the lower feed rolls 84, 86 on shafts 93c, 93d and 93e are driven from the drive shaft 82 through the gear train 96 at one side of the blank feeding unit E and the lower feed rolls 84, 84a and 84b are driven from the gear train 96 through the shaft 93b and gear train 97 at the opposite side of the unit, see FIGURE 3. The lower feed rolls 84 and 86 of the rearward set mounted on stub shafts at the opposite side of the machine are driven from the main drive shaft 82 through a gear train 98, as illustrated in FIGURE 4. The upper rolls 83 and 85 of each set are driven by the lower rolls 84 and 86 which they contact. The gear trains 96, 97 and 98 drive the opposed pairs of feed rolls 83, 85 and 84, 86 at the same peripheral velocity to advance the blanks A at a constant velocity through the feeding unit.

During the advance of the blanks A under control of the feed rolls 83, 84 and 85, 86 the rearward edge of a blank is engaged by a gripper 2. The grippers 2, as later explained more in detail, are mounted between chains 100 and 101 mounted on sprockets 102 and 103 fast on the drive shaft 82 of the blank feeding unit E. As shown in FIGURE 3, the chains 100 and 101 are positioned centrally in the opening 53 between the plates 51 and 52, so that the grippers 2 between the chains may engage the rearward edge of a blank A advanced by the feed rolls 83 to 85. As shown in FIGURE 6, a cam track 104 is positioned between the chains 100 and 101 to open the jaws 105 and 106 of each gripper 2 as it moves toward an upright position to overlie the rearward edge of the blank. As the chains 100 and 101 are driven by the main drive shaft 82 and move at the same velocity of the blank A advanced by the feed rolls 83, 84 and 85, 86, the jaws 105 and 106 of a gripper 2 will overlie the sides of a blank A adjacent its rearward edge as the blank moves forwardly. When the jaws 105 and 106 of a gripper 2 overlying the rearward edge of a blank move to an upright position, the cam follower 107 for actuating the jaw 105 rides off the cam 104 to grip a blank and cause it to be moved forwardly in a linear path at the same constant velocity as when released by the last of the feed rolls.

Thus, the blank feeding unit E operates to feed blanks A successively from the bottom of magazine 1, accelerate the blanks to a predetermined fixed velocity, advance the blanks at said constant velocity so that it may be captured by the grippers 2 moving at the same velocity to continue the advance of the blank A through the body forming unit F as next described.

*Body Forming Unit*

As stated above, each successive blank A is folded to frusto-conical form over an anvil 4 of each body forming unit F and F' and the overlapping side edges of the folded blank are sealed to each other to form a cup body B as the blank is moved in a linear path through the body forming unit at constant velocity.

The detailed construction of each of the body forming units F or F' is illustrated in FIGURES 7 to 19 as comprising a frame 115 mounting spaced horizontal plates 116 and 117 to form a table top at the same level as and abutting the table top of the feeding unit E with a space 118 between the plates through which the grippers 2 project as shown in FIGURE 7. The left hand end of the unit is illustrated in section in FIGURE 7 to show the spaced guide-tracks 119 and 120 for the chains 100 and 101. Guide tracks 119 and 120 are located at opposite sides of the space 118 below the table top. A rail is attached to the underside of guide track 120 and has a cam track 121 in its side below the chain guide track and facing the opening 118. The chains 100 and 101, previously described, ride in the chain guide tracks 119 and 120 as shown in FIGURE 17 and the grippers 2 are pivotally mounted on inwardly projecting pintles of the chains 100 and 101 in spaced relation therealong for rocking movement relative thereto. Each gripper 2 has a cam following arm which rides in the cam track 121, as later described in detail.

Mounted on the plate 116 at the off hand side of the unit as illustrated in FIGURES 7, 8 and 9 is a guide plate 122 having an upwardly inclined edge to initially guide one side of each blank A held by a gripper 2 into a fold as blank moves along the plate. The stationary guides 3 and 5 also are mounted on each of the plates 116 and 117, respectively, and extend along the plate for continuously folding the sides of the blanks over the centrally positioned anvil 4 as they advance along the body forming unit F or F'. The stationary guides 3 and 5 are in the form of rods which extend upwardly and longitudinally of the top of the table and then inwardly toward the anvil 4. The stationary guide 3 is positioned rearwardly with respect to the guide 5 to first engage the side of the blank A initially folded by the guide plate 122 and thereafter fold the other side of the blanks inwardly as illustrated in FIGURE 7. Each of the guide rods 3 and 5 is supported by brackets 126 attached to the plates 116 and 117 of this unit.

Figure 12:
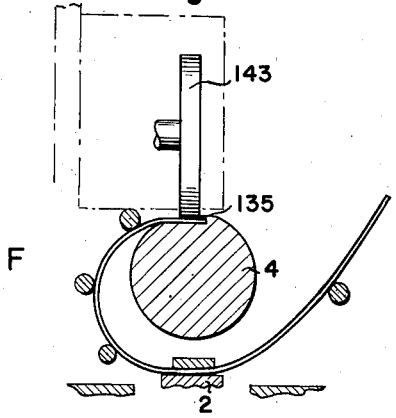
FIGURE 12 is a transverse sectional view taken on line 12—12 of FIGURE 8 showing the adhesive being applied to the exposed edge of one inwardly folded side of the blank and the initial folding of the opposite side of the blank.
Figure 14:
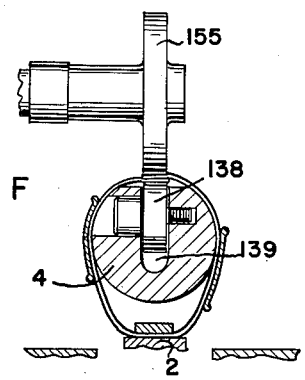
FIGURE 14 is a transverse sectional view taken on line 14—14 of FIGURE 11 to show the overlapping edges of the blank being pressed into sealing engagement by the nip rolls.
Figure 13:
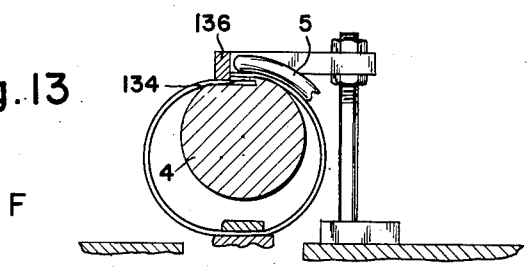
FIGURE 13 is a transverse sectional view taken on line 13—13 of FIGURE 8 and showing an opposite side of the blank folded upwardly to engage its edge with a vertical guide surface to position the edges of the blank in overlapping relationship to form a horizontal seam.

The anvil 4 is supported from the top by suitable brackets 130 so that the blanks A may move thereunder. Anvil 4 comprises a rearward tail portion 131, see FIGURES 8 and 9, under which the blanks are positioned when the sides are folded. This tail portion 131 and its relation to the guide rods 3 and 5 is illustrated in the transverse sectional view in FIGURE 10. Forwardly of the tail portion 131 the anvil comprises a generally cylindrical section 132 flattened on one side and mounting an upright plate 133 as shown in the transverse sectional view in FIGURE 11. The top of this portion 132 of the anvil 4 also is flat with an overlying lip 135 forming a slot 134 therebetween. It will be observed in FIGURE 11 that the guide rod 3 will have guided the edge of a blank A into the slot 134 when it reaches section 132 of the anvil 4 and that the plate 133 provides a vertical surface which the edge of the blank engages. It will still further be observed in FIGURE 11 that the guide rod 5 has initiated the folding of the opposite side of the blank A. Forwardly beyond the section 132 of anvil 4 illustrated in FIGURE 11, the width of the overlying lip 135 from the face of vertical plate 133 has decreased as shown in FIGURE 12 so that the edge of the blank is held by a very short lip only and the side plate 133 has terminated. At a point rearwardly of that shown in FIGURE 12, the anvil 4 has a shape in cross-section as illustrated in FIGURE 13 with a vertical plate 136 overlying the flat top of the anvil and offset laterally from the inner edge of slot 134. FIGURE 13 illustrates the other side of a blank A folded by the guide rod 5 with its edge engaging the side of the vertical plate 136 and overlapping the edge portion of the side first folded and positioned in the slot 134. At a point still further forward, the anvil 4 mounts a roller 138 in a slot 139 as shown in FIGURE 14.

An adhesive is applied to the edge portion of the first folded side of blanks A by an adhesive applying mechanism 140 mounted on the plate 116 of body forming unit F or F'. The adhesive applying mechanism 140 comprises a vertical plate 141 mounting a box 142 and a roller 143 projecting from the bottom of the box and overlying the flat top sufrace of the anvil 132 with a spacing less than the thickness of the blanks A. Adhesive 144 is in the form of a continuous strip and fed from a reel 145 by a pair of cooperating feed rolls 146 driven by suitable gearing 147. The cord adhesive is melted in the box 142 and applied to one edge of a blank A by an applicator roller 143 as the blank moves between it and the anvil 4, the roller 143 feeding the adhesive from the box to the blank. The adhesive applying mechanism 140 is of a conventional construction available on the open market. The plate 141 of the adhesive applying mechanism 140, see FIGURE 7, is positioned between stanchions 148 and 149 and pivotally mounted at one upper corner to the stanchions 148 by a pivot pin 150. The position of the plate 141 and bottom of adhesive applying roller 143 is adjusted by a set screw 151 mounted in a bracket 152 at the other top edge of the plate and engaging the top of the stanchion 149.

Beyond the adhesive applying mechanism 140 is a nip roll 155 positioned to overlie roll 138 in the anvil 4. Nip roll 155 is mounted on the end of a shaft 156, see FIGURES 7, 8 and 9, journaled in a cradle 157 adapted to rock on a shaft 158. The cradle 157 is yieldingly rocked by a spring 159, see FIGURE 9, to engage the nip roll 155 with the roll 138 on the anvil. A gear 160 is mounted on shaft 156 which meshes with a sun gear 161 on the shaft 158, see FIGURE 8. As further shown in FIGURE 8, the sun gear 161 for driving the nip roll 155 and the shafts for driving the adhesive feed rolls and the adhesive applying roll 143 are driven by a chain drive 162 in synchronism with the chains 100 and 101 carrying grippers 2 for advancing the blanks A.

Each body forming unit F or F', the associated adhesive applying mechanism 140 and nip roll 155 and blank feeding unit E or E' are driven from the main drive shaft R of the power drive by a lay shaft S or S', see FIGURE 1. The shaft S or aligned shaft on the body forming unit F, see FIGURE 9, has a sprocket for driving a chain 163 for rotating the sun gear 161 and chain 162. The shaft mounts another pair of sprockets, similar to sprockets 102 and 103, see FIGURE 4, for driving the chains 100 and 101 mounting the grippers 2. Thus, the elements of the body forming unit F and blank feeding unit E are driven in synchronism from shaft S.

A form of gripper 2 first developed is illustrated in FIGURES 15 to 17 as comprising a body frame in the form of a casting having a central boss 165, the top of which constitutes one jaw 106, and laterally projecting arms 166 and 167 through which the inwardly projecting pintles 168 and 169 of certain of the links of chains 100 and 101 project to pivotally mount the grippers 2 for rocking movement, see FIGURE 16. Each gripper 2 has an actuating arm 170 projecting rearwardly from the boss with a cam follower roll 171 projecting laterally of the arm into the grooved cam track 121, see FIGURE 16. Boss 165 of each gripper 2 has a bore 173 and the opposite jaw 105 of the gripper is a flat plate overlying the top of the boss with a push rod 174 extending through the bore. A spring 175 acting between the gripper body and a head 107, constituting a cam follower on the push rod, holds jaw 105 in engagement with jaw 106, but yields when the push rod is actuated by cam 104 to spread the jaws, see FIGURE 6.

As shown in FIGURE 15, the cam track 121 has a horizontal section 176 parallel with the chain guides 119 and 120 for holding grippers 2 in one position to receive and hold a blank A substantially horizontal and another horizontal section 177 at a lower level connected by a curved section 178 for rocking the gripper and blank to an inclined position. The relation of the cam track section 177 is such as to tilt a blank A at an angle to the horizontal equal to twice the angle of inclination of the side wall of a formed cup body B to be formed to position the overlapping edge portions of the blank when folded in a horizontal plane at the top of anvil 4. The cam track 121 may have another section beyond that illustrated in FIGURE 15 to tilt a formed cup body B in an upright position for transfer when released by its gripper 2.

A later developed and preferred embodiment of gripper 2 is illustrated in FIGURES 18 and 19 in which the links 180 of a single chain extend between the chain guides 119 and 120 instead of the separate chains 100 and 101. Each link 180 is of an open rectangular frame having bearing lugs 181 and 182 at one end positioned between wider spaced lugs 183 and 184 at the other end of the next link, see FIGURE 18, with pintles 185 extending through the lugs having rollers 186 and 187 at opposite ends adapted to ride in the chain guides 119 and 120. A gripper 2 is mounted on each link 180 and comprises opposite jaws 105 and 106 of a construction generally similar to that illustrated in FIGURES 15 to 17. Each gripper 2 in this modification, however, is pivotally mounted on a link 180 for rocking movement in the open space of its marginal frame and has a pintle 188 projecting through the body into bearings 190 and 191 projecting upwardly from the sides of the link. An actuating arm 192 has one end mounted fast on a shaft 193 journaled in bearings 190 and 191 and its opposite end mounts a laterally projecting cam follower 194 which rides in the cam track 121. One end of the pintle 188 projecting from the side of gripper 2 and one end of shaft 193 have intermeshing gears 195 and 196 so that rocking movement of actuating arm 192 produces a rocking movement of gripper 2 in the opposite direction. Gear 196 has a greater diameter than gear 195 so that a relatively small rocking movement of actuating arm 192 produces a much greater rocking movement of gripper 2 from a horizontal to an upright position at a location beyond that illustrated and indicated by dotted lines. The sections 197 and 198 of cam track 121 are reversed from the sections 176 and 177 in the form of construction illustrated in FIGURE 15 to rock the gripper 2 in the proper direction. The construction of gripper 2 illustrated in FIGURES 18 and 19 requires a much smaller movement of the actuating arm 192 by the cam track 121 to produce the required angular movement of the gripper 2. A yielding bumper stop 199 also is provided on the link 180 for engagement by the gripper 2 when actuated to an upright position as illustrated by dotted lines in FIGURE 19 and a spring 200 is connected between the actuating arm 192 and link to hold the cam follower 194 against the bottom of the cam track 121.

As the grippers 2 are moved forwardly by the chains 100 and 101 or single chain having links 180, the jaws 105 are actuated to spaced relation to jaw 106 by cam 104, see FIGURE 6, to receive the rearward end of a cup blank A therebetween at the end of its forward advancement by the blank feeding unit E. After the gripper 2 passes beyond the cam 104, the blank A is gripped between the jaws 105 and 106. Gripper 2 with blank A gripped therein is then tilted at an angle equal to twice the angle of inclination of the wall of the cup to be formed prior to forming by the forming unit F to position the seam horizontally on the anvil 4. After the blank A has been formed into a cup body B and the cup body has been captured by a carrier of the transfer unit H, the jaw 105 of the gripper 2 is actuated by a cam similar to cam 104 at the opposite end of the body forming unit F to release the formed cup body.

*Transfer Units*

Figure 22:
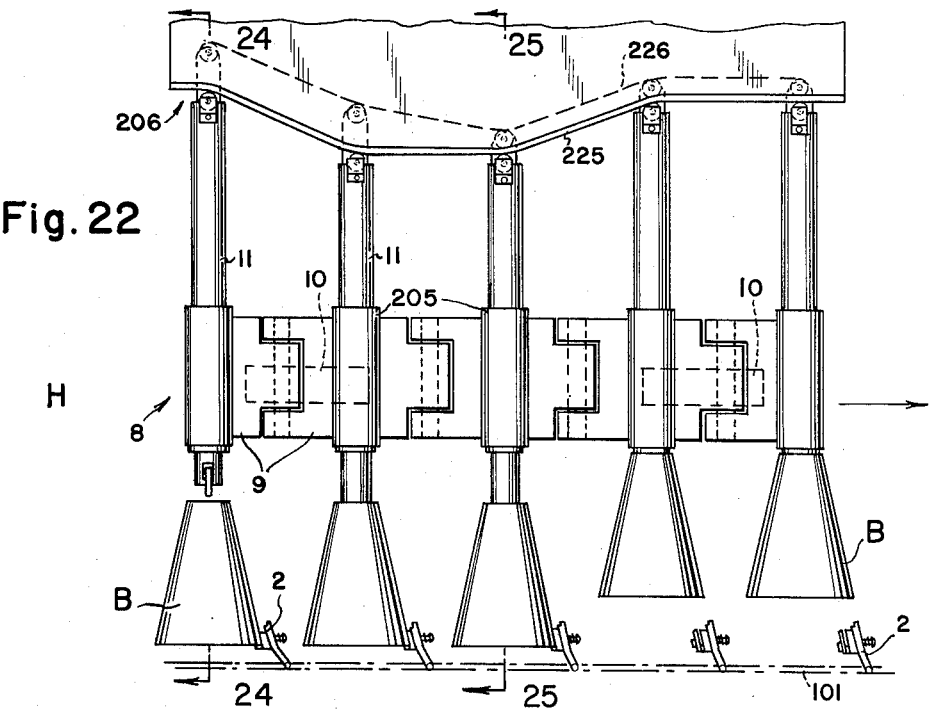
FIGURE 22 is a side elevational view of the portion of the transfer unit cooperating with the body forming unit and showing the links of the conveyor chain each mounting a transfer element and cams for operating the transfer elements vertically at successive stations to grip and convey a formed body.
Figure 26:
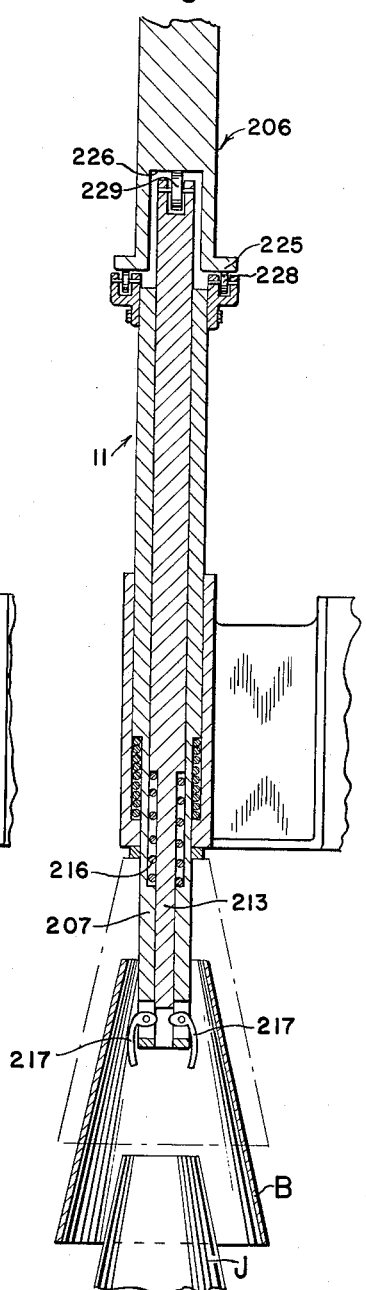
FIGURE 26 is a sectional view similar to FIGURES 24 and 25 taken on line 26—26 of FIGURE 23 showing the sleeve and rod actuated by the cams to position a cup body over a forming mandrel on the finishing unit.

The heads of the transfer units H and H' shown diagrammatically in FIGURE 1 and the operating mechanism therefor are illustrated in detail in FIGURES 22 and 26, inclusive. As previously described, each transfer unit H and H' comprises a conveyor chain 8 of connected links 9 mounted on sprockets 10 for movement in a rectangular path. One side of the rectangular path of conveyor chain 8 overlies the discharge end of a body forming unit F or F' and an adjacent side overlies the conveyor chain 13 of finishing unit G adjacent one end thereof for transferring formed cup bodies B from the grippers 2 of the body forming unit to the mandrels J of the finishing unit. As the transfer units H and H' are identical, a description of one will suffice for the other.

Figure 23:
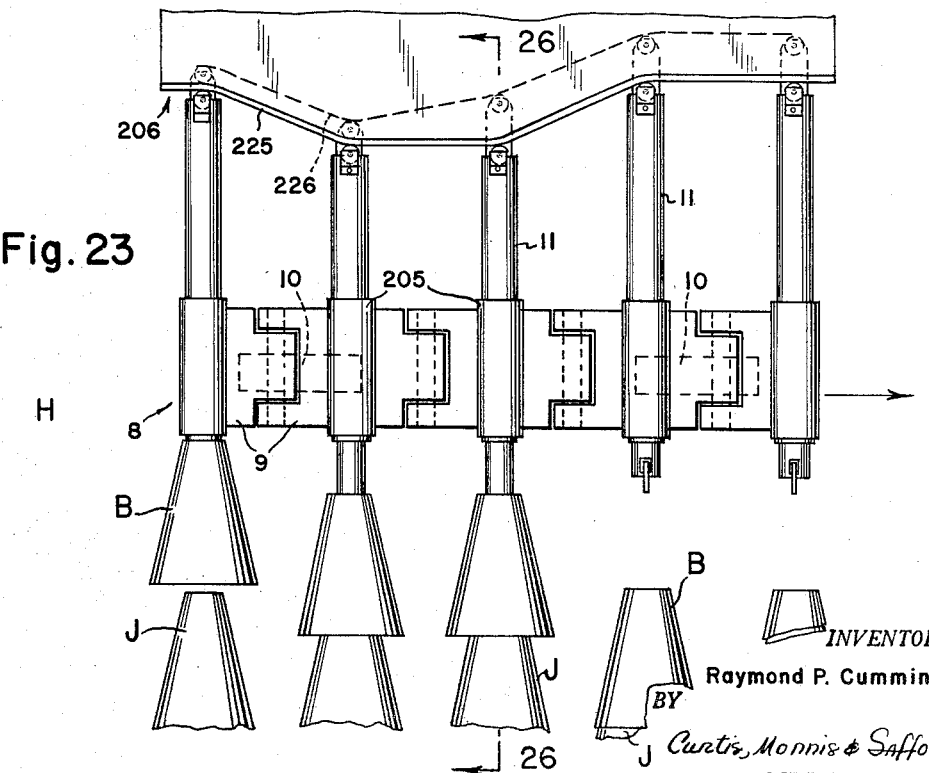
FIGURE 23 is a side elevational view similar to FIGURE 22 illustrating the portion of the transfer unit cooperating with the finishing unit and showing the position of the transfer elements at successive stations to position a formed body on each successive mandrel of the finishing unit.

FIGURE 22 illustrates the side of the path of the conveyor chain 8 overlying the body forming unit F. As shown in FIGURE 22 each link 9 of the conveyor chain 8 mounts a transfer head 205 in which push rod 11 is reciprocated by a cam track 206 to its various operating positions. As a head 205 of transfer unit H moves from the left to the right as viewed in FIGURE 22, the push rod 11 is depressed by the cam track 206 into a formed cup body B on the body forming unit F, mechanism actuated to capture a formed cup body and the push rod raised with a cup body thereon. FIGURE 23 illustrates the side of the path of the transfer unit H overlying the finishing unit G and showing the push rod 11 actuated to lower a formed cup body B over each mandrel J, release the cup and withdraw the push rod from the formed cup body. It will be noted that the links 14 of conveyor chain 13 mounting the mandrels J are the same pitch and aligned with the links 9 of the conveyor chain 8 and the two chains 8 and 13 are driven at the same velocity so that a transfer head 205 overlies each mandrel J. Thus, the heads 205 overlie and move at the same velocity as the grippers 2 and mandrels J during a transusfer of a formed cup body from the body forming unit F to the finishing unit G.

Figure 24:
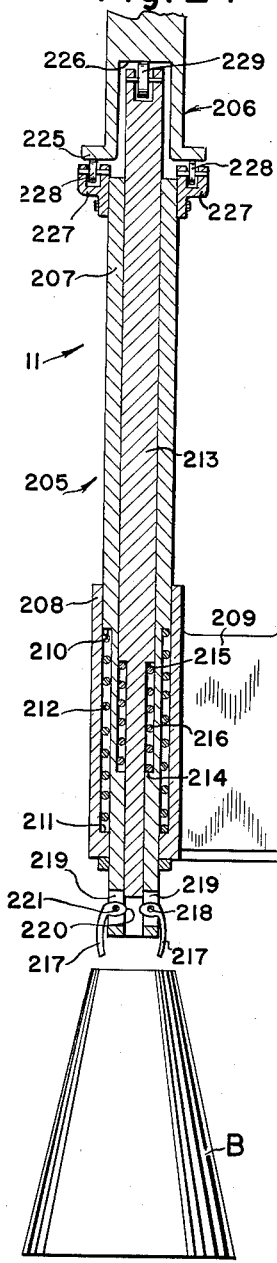
FIGURE 24 is a sectional view taken on line 24—24 of FIGURE 22 and showing the relatively slidable sleeve and rod in raised position and the spreaders on the sleeve.
Figure 25:
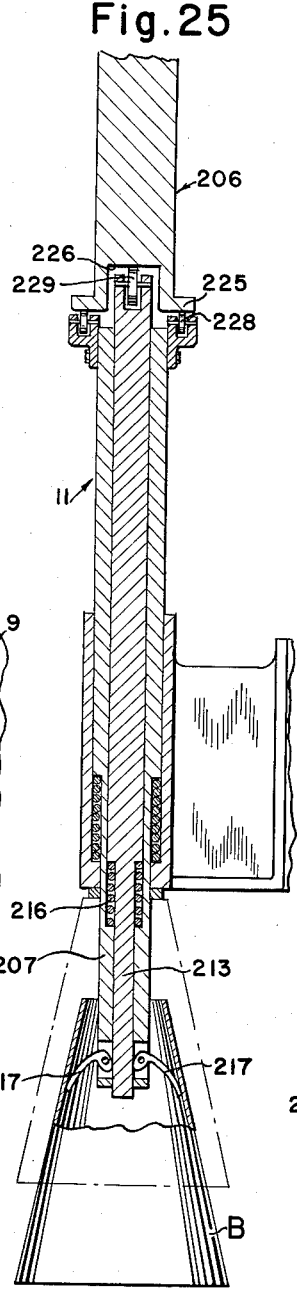
FIGURE 25 is a sectional view similar to FIGURE 24 taken on line 25—25 of FIGURE 22 and showing the sleeve lowered into a cup body and the rod actuated to cause the spreaders to engage a cup body.

As shown in detail in FIGURES 24 to 26, each push rod 11 comprises a sleeve 207 slidably mounted in a vertically arranged cylindrical bearing 208 attached to its link 9 by a web 209. Sleeve 207 and cylindrical bearing 208 have offset shoulders 210 and 211, respectively, to provide an annular space therebetween with the ends of a compression spring 212 therein engaging the shoulders to yieldingly press the sleeve 207 upwardly with respect to the cylindrical bearing. A rod 213 is mounted to slide in the sleeve 207 and the sleeve and rod also have offset shoulders 214 and 215, respectively, with a spring 216 therebetween for holding the push rod raised with respect to the sleeve. Mounted on the lower end of the sleeve 207 are fingers 217 for engaging the inside of a formed cup body B. Each finger 217 has a upper end 218 projecting laterally through a slot 219 in the sleeve with a nose 220 projecting inwardly beyond the wall of the sleeve and having a surface curved inwardly toward the axis of the sleeve. Each of the fingers 217 is mounted on a tangential pivot pin 221 in sleeve 207 so that the fingers hang down as illustrated in FIGURE 24 with their upper ends 218 projecting inwardly from the wall of the sleeve. The fingers 217 may be arranged in opposed pairs as illustrated in FIGURE 24 or three such fingers may be arranged in equi-angular relationship. Thus, when the sleeve 207 is depressed relative to the head 205 against the action of the spring 212 the lower end of the sleeve and pivoted fingers 217 enter the open upper end of the formed cup body B as illustrated in FIGURE 25, and when the rod 213 is depressed relative to the sleeve the end of rod engages the inwardly projecting ends of the pivoted fingers 217 and rocks the fingers radially on the sleeve to engage the inside wall of the formed cup body.

The sleeve 207 and push rod 213 are actuated independently by separate tracks 225 and 226 of the cam 206. The upper end of the sleeve 207 has brackets 227 each mounting a follower roller 228 engaging the cam track 225. The upper end of rod 213 is bifurcated and mounts a follower roller 229 engaging the cam track 226. Referring back to FIGURE 22, at the first position at the left of the figure, the cam tracks 225 and 226 position the lower end of the sleeve 207 and fingers 217 above the top of the formed cup body B, see FIGURE 24. During movement of a head 205 from the first position to the second position illustrated in FIGURE 22, both cam tracks 225 and 226 incline downwardly to depress both the sleeve 207 and push rod 213 in unison to cause the lower end of the sleeve and fingers 217 to enter the open top of the formed cup body B. During the movement of the head 205 from the second to the third position, cam track 225 extends horizontally so that the lower end of the sleeve 207 is held in the formed cup B, but the cam track 226 is inclined downwardly with respect to the cam track 225 to depress the rod 213 relative to the sleeve to spread the fingers 217 into engagement with the walls of the formed cup body, see FIGURE 25. As the head 205 moves from the third position to the fourth position illustrated in FIGURE 22, both cam tracks incline upwardly in parallel relation to lift the formed cup body B after it has been released by its gripper 2 as illustrated in dot and dash lines in FIGURE 25.

The head 205 with a formed cup B thereon then moves in a path at right angles to its path over the cup forming unit F for movement over and in unison with a mandrel J of the fiinshing unit G as illustrated in FIGURE 23. In other words, the fifth position of the head 205 in FIGURE 22 is the same position of the head in the first position of FIGURE 23, but viewed at right angles thereto. During the movement of the head 205 from the first position to the second position illustrated in FIGURE 23 the cam tracks 225 and 226 incline downwardly in parallel relation to lower the sleeve 207 and push rod 213 in unison to position the bottom portion of the formed cup B over a mandrel J. This movement of the sleeve 207 lowers the formed cup body B from the dotted line position to the full line position illustrated in FIGURE 26. As the head 205 moves from the second to the third position illustrated in FIGURE 23, the cam track 226 rises with respect to the cam track 225 to raise the rod 213 under the action of spring 216 to release the fingers 217, which fall to the releasing position illustrated in FIGURE 26. The formed cup body B then continues its movement by gravity over the mandrel J. As the head 205 moves from the third position to the fourth position illustrated in FIGURE 23 both cam tracks 225 and 226 are inclined upwardly in parallel relation to raise the sleeve 207 and push rod 213 to a position above the top of the formed cup body or, in other words, to the initial position illustrated at the left in FIGURE 22.

Thus, the formed cup bodies B are captured by the successive heads 205 of the transfer units H and H' as fast as they are formed on the body forming units F and F' and are delivered to successive mandrels J at opposite sides of the finishing unit G adjacent its opposite ends. During such transfer of cup bodies B the heads 205 of the transfer units H and H' move at the same velocity in juxtaposed relation to the formed cup bodies B on units F and F' and mandrels J on finishing unit G. The heads 205 then move through the other two sides of the rectangular path of movement of the chain 8 with the push rods 11 in the raised positions illustrated at the right hand end of FIGURE 23 back to the left hand end of FIGURE 22 under the control of the cam tracks 225 and 226 of cam 206. As there is a head 205 on each link 9 of the transfer units H and H' for each of the grippers 2 on the body forming units F and F' and each of the mandrels J on the finishing unit G, and as the grippers, heads and mandrels all move at the same velocity, a formed cup body B is transferred to each mandrel J.

Bottom Insert Forming Turrets

Figure 27:
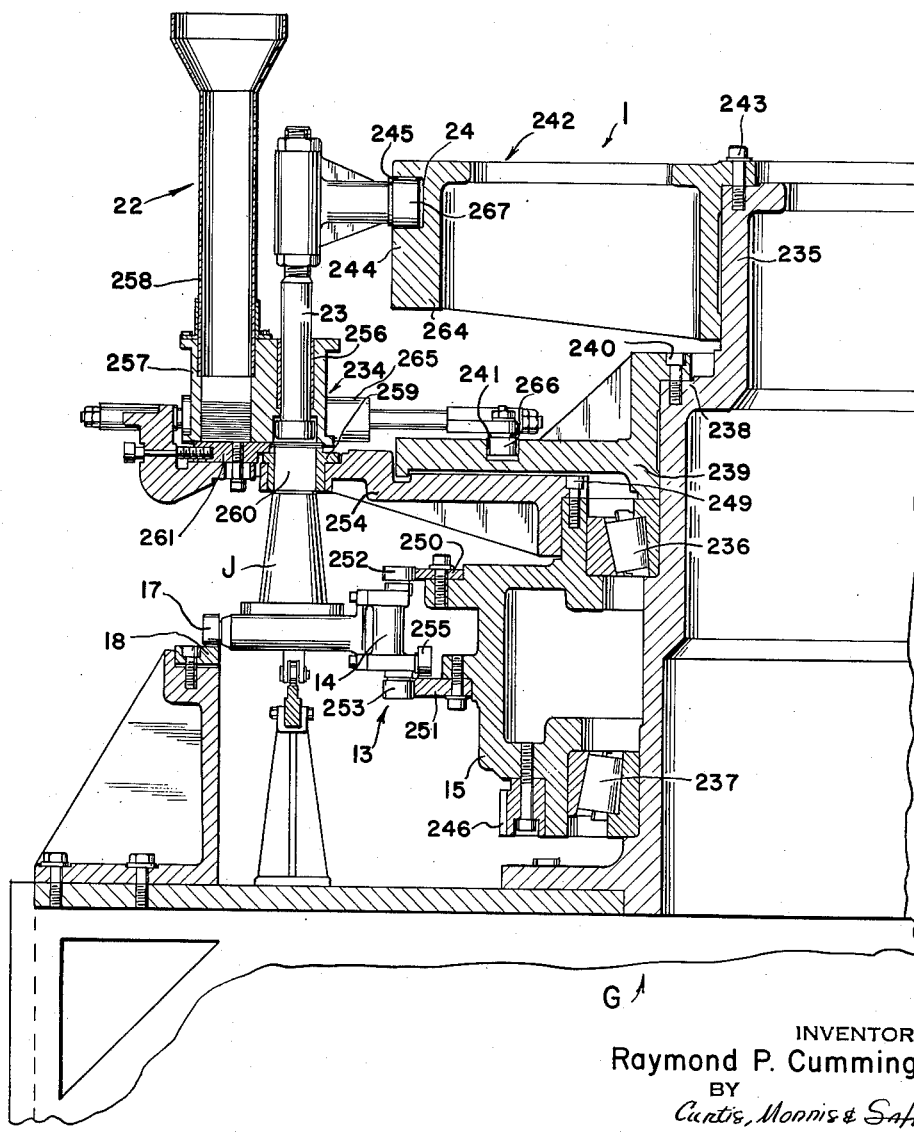
FIGURE 27 is a transverse sectional view taken on line 27—27 of FIGURE 1 and showing the juxtaposed mandrel chain and turret at one end of the finishing unit for forming cup bottom inserts and applying them onto each mandrel.

The turrets I and I' at opposite ends of the finishing unit G, see FIGURE 1, are of identical construction so that a description of one will suffice for the other. The detailed construction of the turret I is illustrated in FIGURES 27 to 29. As previously explained, the turret I has a bottom insert forming head 234 for each mandrel J on the underlying conveyor chain 13 and each head has a magazine 22 and a forming punch 23 operated by a cam 24.

As shown in FIGURE 27 the turret I is mounted to rotate on a stationary pedestal 235 of cylindrical shape with vertically spaced roller bearings 236 and 237 therebetween. Also mounted on an offset shouldered portion 238 of the stationary pedestal 235 above the bearings 236 and 237 is a circular cam plate 239 connected thereto by screws 240 and having a cam track 241 in the upper horizontal face of the plate. Overlying the horizontal cam plate 239 is another circular cam plate 242 attached to the top of the pedestal by screws 243. Cam plate 242 has a depending skirt 244 at its outer periphery with a cam track 245 in the outer vertical surface of the skirt.

As previously explained, turret I is driven from the main drive shaft R and the turret mounts a ring gear 246, see FIGURE 27, which meshes with a gear of the gear train 247, see FIGURE 1. The turret I comprises a lower sprocket portion 15 having notched sprocket plates 250 and 251 in vertical spaced relation for meshing engagement with spaced rollers 252 and 253 on the inner side of links 14 of conveyor chain 13. The outer side of each link 14 of the conveyor chain 13 is supported by a roller 17 which bears on and rolls along a track 18. The inner side of each link 14 is supported by a roller 255 which bears on and rolls along the lower sprocket plate 251. A mandrel J is mounted on each link between the inner rollers 254 and outer roller 17. Thus, the sprocket portion 15 of turret I is rotatable on the pedestal 235 with the chain 13 mounting mandrels J and the sprocket and chain move at the same linear velocity with respect to the fixed pedestal and vertically spaced cam plates 239 and 242.

Mounted on the top of sprocket 15 of the turret I is a circular plate 254 which underlies the horizontal cam plate 239. Circular plate 254 of the turret I is attached to the sprocket portion 15 by screws 249. The plurality of bottom insert forming heads 234 which overlie the mandrels J are mounted on the circular plate 254 and move therewith around the pedestal 235 at the same constant velocity. Each head includes the magazine for bottom blanks C and the plunger 23 for forming the blanks into bottom insert D. Head 234 comprises a block having a vertical bore 256 mounting the plunger 23 and a bore 257 mounting a chute 258 therein which projects upwardly therefrom and constitutes the magazine 22. A die plate 259 underlies the block of each head 234 and has a cylindrical opening 260 underlying the plunger 23 in alignment therewith. As illustrated in detail in the enlarged views in FIGURES 28 and 29 a picker plate 261 is mounted to slide in a slot 262 between the block and die plate 259. The picker plate 261 has a shoulder 263 of a height less than the thickness of a blank C to be formed which is adapted to pick the lowermost blank from magazine 22 and advance it to a position between the plunger 23 and forming opening 260 in the die plate 259.

Picker plate 261 is mounted on the end of a push rod 264 slidably mounted in a bearing in the block 265 and attached thereto by a suitable connecting means. The inner end of the push rod 264 has a cam follower 266, see FIGURE 27, positioned in the cam track 241 of the horizontal cam plate 239. The cam track 241 is so shaped as to reciprocate the push rod 264 and picker plate 261 of each head 234 as it moves around the outside of the pedestal 235, diametrically opposite the position illustrated in FIGURE 27, to position a blank C between the plunger 23 and forming opening 260 of the die plate 259 as shown in FIGURES 27 and 28. Plunger 23 also mounts a horizontally arranged cam follower 267 engaging the cam track 245. During the rotation of a head 234 around the outside of the pedestal 235 the cam track 245 operates the forming punch 23 from the position illustrated in FIGURE 27 to that illustrated in FIGURE 29 to form a blank C into a bottom insert D and apply it into the top of the underlying mandrel J. As a circular blank C is forced through opening 260 of die plate 259, its peripheral edge portion is folded upwardly to form a bottom insert D of circular form having an upstanding peripheral flange 269 as shown in FIGURE 20. Forming punch 23, in addition to forming an insert D, delivers the insert into a recess 268 in the upper end of an underlying mandrel J, see FIGURE 29. Before a head 234 on the turret I has completed a pass around the outside of the pedestal 235 the cam track 245 raises the plunger 23 to raise its lower end from its mandrel.

Circular bottom blanks C produced in the cutting press N are transferred to the magazines 22 of the plurality of forming heads 234 which fall by gravity toward the picker plate 261 at the bottom of the magazine. As each mandrel J on a link 14 of chain 13 moves under the turret I, a blank C has been fed between the plunger 23 and forming opening 260 of die plate 259 during rotation around the outside of the pedestal 235. During rotation of the head 234 around the outside of pedestal 235 the plunger 23 is reciprocated to form a bottom insert D, apply the form insert to the recess 268 in the top of the mandrel J and raise the plunger 23. Cam track 241 on horizontal cam plate 239 reciprocates the push rod 264 and picker plate 261 on the rotating turret I to pick a blank C from the bottom of the magazine 22 and feed it into position between the plunger 23 and mandrel J; and cam track 245 on vertical cam plate 242 reciprocates forming punch 23 on the turret during rotation of the latter relative to the pedestal. As a head 234 is provided for each mandrel J and as the turret I moves the head and mandrel at the same linear velocity, a formed bottom insert D is applied to each mandrel J during rotation around each end of the finishing unit G.

*Crimping and Knurling Mechanism*

Figure 30:
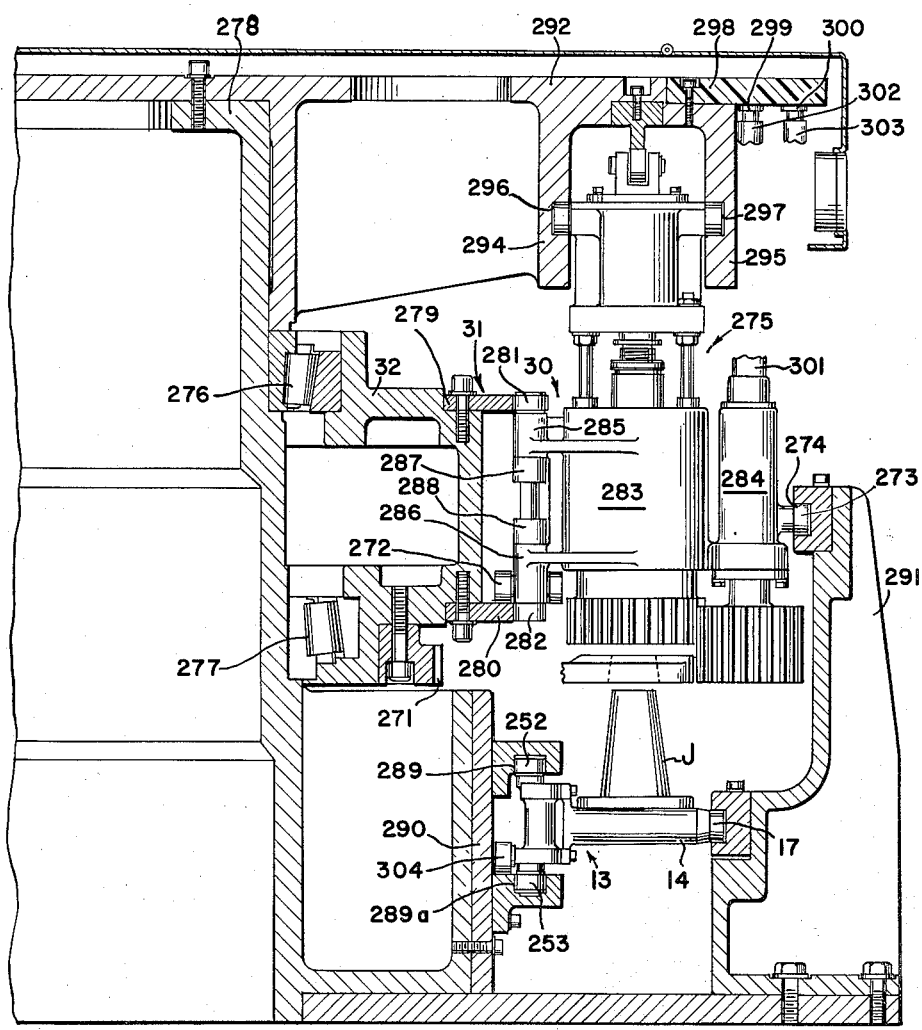
FIGURE 30 is a sectional view taken on line 30—30 of FIGURE 2 to show one of the crimping, knurling and/or heating heads on one conveyor chain overlying a mandrel on another conveyor chain.

A crimping and knurling head 275 is mounted on each link 30 of the chain 31 and overlies a mandrel J on each link 14 of chain 13 at each side of the cup finishing unit G, see FIGURES 1 and 2. Chain 31 is mounted on the spaced sprockets 32 and 33 positioned inwardly from the turrets I and I. The crimping and knurling head 275 on each link 30 of chain 31 is illustrated in detail in FIGURES 30 to 36. In FIGURE 30 the head 275 is illustrated adjacent the sprocket 32 and in FIGURE 31 the head is illustrated partly in section at a position beyond the sprocket.

As shown in FIGURE 30 the sprocket 32 is mounted to rotate on vertically spaced roller bearings 276 and 277 on a fixed pedestal 278 and the arrangement is generally similar to the sprocket 15 for chain 13 on pedestal 235. Sprocket 32 also mounts a ring gear 271 which meshes with the gear train 247, see FIGURE 1, to drive the chain 31 mounting the knurling heads 275 in synchronism with the chain 13 mounting the mandrels J at the same linear velocity. Vertically spaced knotched sprocket plates 279 and 280 mesh with rollers 281 and 282 on the links 30 of the chain 31. Each link 30 comprises separate attached housings 283 and 284 for mounting the crimping and knurling mechanism and a driving motor, respectively, and the housing 283 has spaced pairs of connecting lugs 285, 286 and 287, 288 at opposite sides which interleave to pivotally connect adjacent links for articulation. Lug 286 mounts a roller 272 which bears on and rides along sprocket plate 280 to support the inner side of the link and housing 284 mounts a roller 273 which rides in a guide track 274 in a rail bracket 291 to support the outer side of the link.

The rollers 252 and 253 on each link 14 of chain 13 ride in grooved guide tracks 289 and 289a mounted on a plate 290 extending between the sides of the pedestals 278 and the roller 304 rides on a horizontal surface of one of the tracks. The roller 17 at the outer side of link 14 rides in a grooved track in bracket 291 and constitutes a continuation of the track 18. The mandrel J on each link 14 underlies the housing 283 of link 30 on a common axis. Overlying the head 275 is a stationary cam plate 292 having a central cam track 293 and spaced depending sides 294 and 295 with cam tracks 296 and 297 therein for operating the crimping and knurling mechanism in housing 283. Positioned laterally of the cam plate 292 is an insulating plate 298 having spaced electrical rails 299 and 300. A trolley 301 projects upwardly from the motor housing 284 and carries the spaced conducting brushes 302 and 303 engaging the spaced rails 299 and 300.

Figure 31:
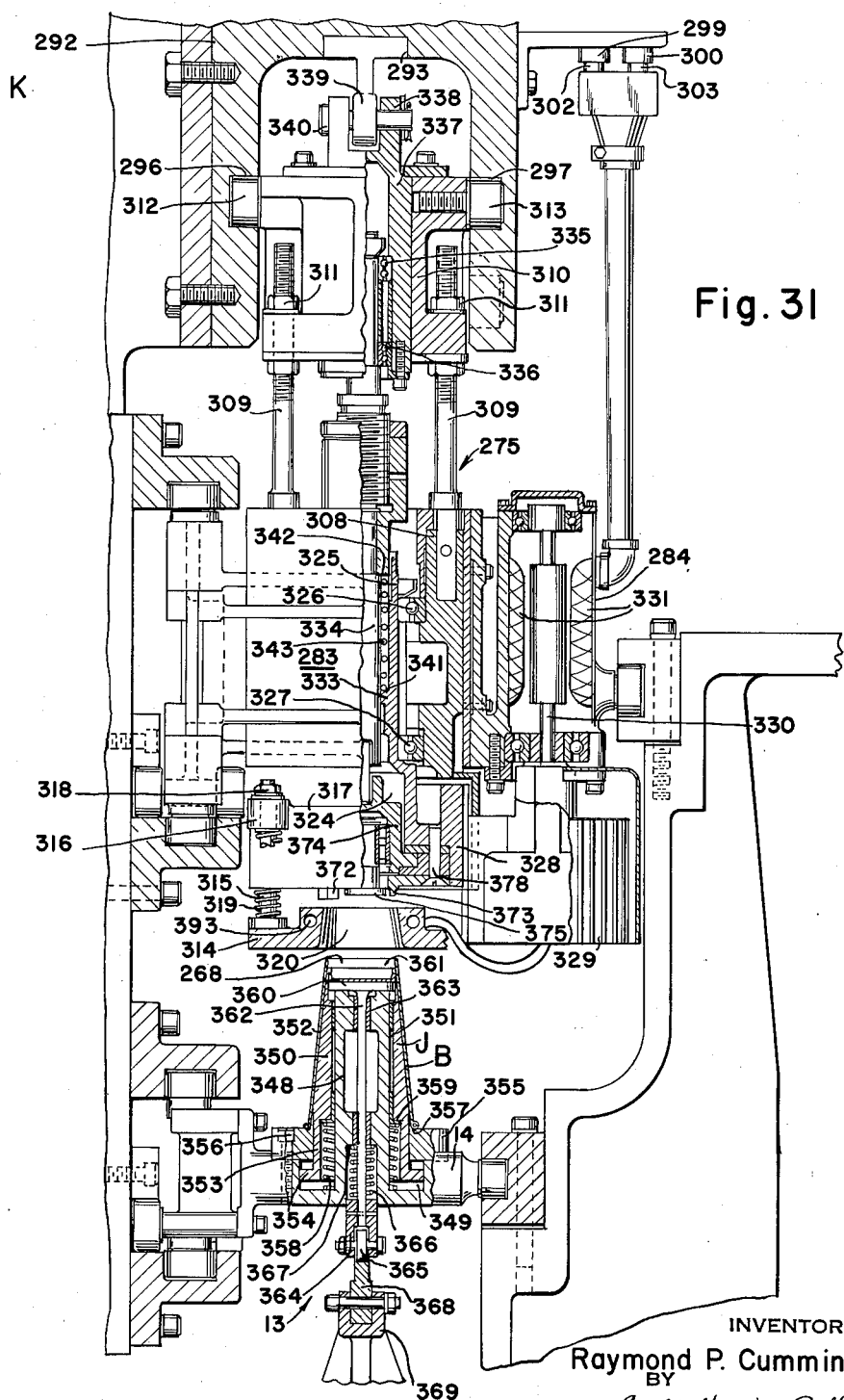
FIGURE 31 is an enlarged part sectional view of the crimping and knurling head and mandrel.

Referring now to FIGURE 31, the housing 283 is an annular bearing open at the top and bottom in which the operating mechanism of head 275 is mounted for vertical sliding movement. The operating mechanism comprises an outer annular sleeve 308 mounted to slide in the housing 283 and having rods 309 projecting upwardly therefrom. The upper ends of the rods 309 are threaded, extend through lugs of an annular cam follower housing 310 and adjustably connected thereto by positioning nuts 311 on the threaded ends of the rods. The cam follower housing 310 has laterally projecting cam rollers 312 and 313 at its sides adapted to ride in the cam grooves 296 and 297 of the stationary cam plate 292. Thus, the annular sleeve 308 is adapted to move vertically in the housing 283 as the head 275 moves along one side of the finishing unit G as controlled by the cam tracks 296 and 297.

A presser plate 314 underlies the bottom of the sleeve 308 in spaced relation thereto and is yieldingly connected thereto for movement vertically thereon. As shown in FIGURE 31, the presser plate 314 has a series fo rods 315 on a skirt 317 projecting laterally and downwardly from the lower end of the sleeve. Nuts 318 on the upper end of rods 315 limit the downward movement of the presser plate 314 relative to the sleeve 308 and compression springs 319 surrounding the rods and acting between the plate and lugs 316 on the sleeve hold the presser plate in spaced relation to the sleeve, but yield to permit vertical movement of the presser plate relative to the sleeve. The presser plate 314 has a conical shaped opening 320 of a size to engage a formed cup body B on an underlying mandrel J and press is downwardly together with the mandrel, as later explained in detail.

An inner sleeve housing 325 is mounted to rotate in vertically spaced antifriction bearings 326 and 327 in the outer sleeve 308 and the inner sleeve projects below the housing 283 and into the depending skirt 317. The lower depending end of inner sleeve 325 is an enlarged hollow cylinder providing an axial chamber 324 and has a ring gear 328 on its outer periphery. Ring gear 328 meshes with a driving pinion gear 329 at the lower end of a motor shaft 330 projecting from the housing 284. Motor windings 331 in the housing 284 are energized through the electric rails 299 and 300 and conducting brushes 302 and 303 of the trolley 301 to rotate the gear 329 and the inner sleeve 325 during movement of the head 275 around the periphery of the finishing unit G.

Mounted axially in the inner sleeve 325 is a push rod 334 which projects upwardly from the inner sleeve into the follower head 310. Push rod 334 is connected to inner sleeve 325 by splines 333 for rotation therewith while permitting relative movement vertically and the upper end of the push rod rotates in antifriction bearings 335 and 336 in a sleeve 337 extending through the follower head 310. Sleeve 337 has a bifurcated upper end 338 mounting a cam follower roller 339 on a transverse pin 340 and engaging the cam track 293. The inner sleeve 325 and push rod 334 have opposed shoulders 341 and 342 with a spring 343 therebetween to permit vertical movement of the push rod relative to the inner sleeve during their rotation in the sleeve 308. It will be noted in FIGURE 31 that the ring gear 328 has a substantial vertical height to permit vertical movement of the sleeve 308 while maintaining rotation of the inner sleeve 325.

Thus, during longitudinal movement of the head 275 along the side of the finishing unit G the sleeve 308 may be reciprocated vertically by the cam tracks 296, 297 the inner sleeve 325 rotated relative to the sleeve 308 during such vertical reciprocation therewith and the push rod 334 reciprocated by the cam track 293 relative to the inner sleeve 325 and outer sleeve 308. During vertical movement of the sleeve 308 downwardly, the presser plate 314 yieldingly engages the formed cup body B mounted on the mandrel J.

As illustrated in FIGURE 31 each link 14 of chain 13 has a laterally projecting metal block with a cylindrical post 348 projecting upwardly therefrom at the axis of the rotating inner sleeve 325 in a head 275 and an annular recess 349 surrounding the base of the post. The mandrel J is formed as a sleeve 350 mounted to slide vertically on the post 348. Mandrel sleeve 350 has an axial bore 351 closely fitting the outer periphery of the post and a conical periphery 352 corresponding to the conical shape of a formed cup body B. Below the conical peripheral portion 352 of the sleeve 350 is a cylindrical section 353 with an outwardly projecting radial flange 354 at its lower end which fits in the annular recess 349 of the link body. An annular plate 355 is mounted on the link body by screws 356 which closely fits the cylindrical section 353 of the sleeve 350 and overlies the radial flange 354. The edge portion of the annular plate 355 adjacent the cylindrical section 353 of the mandrel sleeve 350 has an annular groove 357 for rolling the edge of a formed cup body B. A helical compression spring 358 is positioned between the bottom of the annular recess 349 and an annular shoulder 359 on the mandrel sleeve 350 for yieldingly holding the sleeve in raised position relative to the post 348, but the spring yields to permit the sleeve to be depressed relative to the post and forming plate 355. Mounted on the top of the post 348 is a circular plate 360 slidable in an annular recess 361 in the upper inside periphery of the sleeve 350. Plate 360 has a push rod 362 depending through an axial bore 363 in the post 348 with a follower head 364 at its lower end mounting a cam follower roller 365. A spring 366 surrounds the push rod 362 between the follower head 364 and a shoulder 367 on the post 348 to seat the plate 360 on the top of post 348, but yieldingly to lift the plate upwardly from the post. Underlying the mandrel J is a bracket 369 mounting a cam track 368 engaged by the follower head 364. It will be observed that plate 360 when seated on the top of post 348 is positioned below the top of mandrel sleeve 350 to provide the cylindrical recess 268 into which the bottom insert D of a cup to be formed is seated.

In operation the sleeve 308 of the head 275 is depressed by cam tracks 296, 297 and follower head 310 to engage the presser plate 314 with a formed cup body B on the sleeve 350 of the mandrel J. Continued downward movement of the sleeve 308 causes the pressure plate 314 to depress the sleeve 350 of the mandrel J with a cup body B tightly thereon. Such downward movement of the cup body B engages the lower edge of the cup body B with the annular groove 357 in forming plate 355 and rolls the edge into an annular bead, see FIGURE 21. During such depression of the sleeve 350 of the mandrel J, the springs 319 between the presser plate 314 and sleeve 308 and spring 358 between the link 14 and sleeve 350 yield to permit such relative movement of the sleeve and post. As the mandrel sleeve 350 moves downwardly the bottom insert D seated on the circular plate 360 presses its upwardly projecting flange 269 of the insert against the inside of the wall of the cup body B which extends upwardly beyond the mandrel J and flange. While the assembly in sleeve 308 is being depressed the motor winding 331 has been energized from the brushes 302 and 303 to rotate the shaft 330 which, acting through the pinion gear 329, rotates the ring gear 328 and inner sleeve 325. When the assembly in sleeve 308 has reached its lowermost position the push rod 334 is depressed relative to the inner sleeve 325 against the action of the spring 343 to engage the crimping and knurling tools with the upper edge of the formed cup body B.

The crimping and knurling tools are illustrated in FIGURES 32 to 36 as comprising grooved blades 372 and 373, see FIGURES 31 and 35, for crimping the extended upper edge of the cup body B over the flange 269 of the bottom insert D and a block 374 mounted to slide laterally in the axial chamber 324 at the lower end of inner sleeve 325 and mounting rotating knurling tool 375. The crimping blades 372 and 373 depend from a plate 377 attached to the lower end of inner sleeve 325 by screws 378. The crimping blades 372 and 373 continuously rotate and the grooved portion 376, see FIGURE 35, overlies the upwardly projecting edge portion of the formed cup body B. As the inner sleeve 325 is depressed the combined action of bottom plate 377 and grooved blades 372 and 373 spin and fold the upper edge of the cup body inwardly as guided by the side of the grooves 376 to continuously crimp the edge as illustrated in FIGURE 35.

The sliding block 374 is mounted to slide on plate 377 in opposed guideways 380. The guideways 380 are formed in arcuate blocks 381 clamped between the bottom plate 377 and an annular shoulder 387 of the inner sleeve 325 adjacent the ring gear 328, see FIGURES 31, 32 and 33. The bottom plate 377 has a central opening through which the knurling tool 375 depends and of a size to adapt the tool to move laterally to engage the crimped edge of the cup body B. The knurling tool 375 is in the form of a roller having a serrated edge and mounted on the lower end of a shaft 382 rotatable in ball bearing 383 in the sliding block 374. Sliding block 374 rotates with the inner sleeve 325 and push rod 334 and the block is connected to the push rod by a toggle link 384. The lower end of the link 384 is pivotally connected between spaced ears 385 and 386, see FIGURES 32 and 33, projecting upwardly from the top of the block 374 at one edge and the opposite end of the link is pivotally connected to the lower bifurcated end of the rod 334. Thus, when the inner sleeve 325 is depressed the block 374 and knurling rollers 375 enter the upwardly projecting end of the mandrel sleeve 350. Downward movement of the push rod 334 relative to the sleeve 325 causes the block 374 to slide laterally and engage the knurling roller 375 with the crimped edge of the cup body B against the upwardly projecting flange of the mandrel sleeve.

Crimping blades 372 and 373 are positioned at right angles to the path of movement of the knurling roller 375 in the direction of rotation and the downward movement of the knurling roller and blades is concurrent so that the edge of the cup B is folded over the flange 269 of the insert D before the block 374 and knurling tool 375 are actuated. After the edge of the cup body B has been crimped, the cam track 293 actuates push rod 334 relative to the sleeve 325 to cause the knurling roller 375 to engage and knurl the folded over edges of the cup body and flange of the insert to complete the attachment of the bottom insert to the cup body, as illustrated in FIGURE 36. When the cup blanks B are to be coated with wax the knurling operation may be sufficient to seal the joint between the cup body B and bottom insert D. In some cups it is desirable to provide the inter-engaging portions of the cup body and flange of the bottom insert with a pressure sensitive adhesive to insure the sealing of the joint between the parts during the knurling operation. In other cases the adhesive may be thermosensitive and when the cups are coated with polyethylene the presser plate 314 is heated and the knurling roller 375 is heated to seal the joint between the parts, to a desired temperature by a heating element 393, see FIGURE 31, to bond the polyethylene on the separate parts. To this end, rail 299 and rail 300 supply electric current to the heating element.

To summerize the operation of the crimping and knurling mechanism a mandrel J with a bottom insert D mounted in its top and a cup body B overlying the bottom insert comes into position underlying a crimping and knurling head 275. Motor winding 331 is energized from the conductor rails 299 and 300 through the brushes 302 and 303 to energize the motor and rotate shaft 330, see FIGURE 31. Pinion gear 329 meshing with ring gear 328 rotates the inner sleeve 325. With the inner sleeve 325 and the crimping blades 372 and 373 and knurling tool 375 rotating relative to the outer sleeve 308, the entire assembly is moved downwardly by the cam tracks 296 and 297 acting on the follower head 310, as the head moves longitudinally at one side of the finishing unit G.

As the assembly moves downwardly the presser plate 314 engages the formed cup body B on the sleeve 350 of mandrel J and depresses the latter relative to the post 348, see FIGURES 31 and 32, to roll the bottom edge of the cup body B and form a bead. Continued downward movement of the assembly in the housing 283 causes the grooved crimping blades 372 and 373 to engage the upwardly projecting edge of the cup wall and fold the wall inwardly over the upwardly extending flange 269 of the bottom insert D as illustrated in FIGURE 35. This movement continues until the crimping is complete at which time the push rod 334 is depressed relative to the inner sleeve 325, see FIGURE 32, and acting through the toggle link 384, and sliding block 374 engages the knurling roller 375 with the crimped edge. The knurling roller 375 rotates on its own axis as it moves in orbit during its rotation with the inner sleeve 325 to knurl the crimped edge with a pressure applied by the push rod 334 to complete the knurling of the crimped edge as illustrated in FIGURE 36.

After the crimping and knurling is complete the push rod 334 is raised by the spring 343 as controlled by the cam track 293 to withdraw the knurling roller 375 from engagement with the cup and the entire assembly of inner sleeve 325 and outer sleeve 308 is raised to the initial position illustrated in FIGURE 31 as controlled by cam tracks 296 and 297. The mandrel J with a finished cup thereon is then moved to the doffing unit L or L' at which time the cam track 369 actuates the push rod 362 and cicular plate 360 in mandrel J to lift and release the formed cup from the mandrel for doffing.

*Doffing Mechanism*

After the upper end of a cup body B has been crimped and knurled to the flange of a bottom insert D on the finishing unit G the completed cup on each mandrel J is conveyed by the moving chain 13 to a doffing mechanism L or L' as illustrated in FIGURE 1. As the doffing mechanism L and L' are identical a description of one will suffice for the other.

As previously described, each doffing mechanism L and L' comprises a conveyor chain 36 mounted on sprockets 37 for movement in a rectangular path. Each link 39 of the chain 36 mounts a doffing head 40 and at one side of its rectangular path the chain and heads overlie the chain 13 and mandrels J thereon. Thus, a doffing head 40 on the conveyor chain 36 of the doffing mechanism overlies each mandrel J on the conveyor chain 13 of the finishing unit G in juxtaposed relation and the head and mandrel move at the same linear velocity. During the concurrent movement of a doffing head 40 and mandrel J in juxtaposed relation, the finished cup on the mandrel is removed by the overlying doffing head and transferred thereby to the conveyor chute 41. The conveyor chute 41 may constitute a conveyor belt, but preferably is a suction tube for conveying successive cups to a stacking and packaging machine.

Each doffing head 40 is of substantially the same construction as the transfer heads 205 on the transfer units H and H' and, therefore, has not been illustrated in detail. Referring to FIGURES 22 to 26, each doffing head 40 comprises a sleeve 207' and push rood 11' movable relative to each other. The sleeve 207' is actuated by a cam track 225' to its lowered and raised positions and the push rood 213' is raised and lowered relative to sleeve 207' by a cam track 226'. Instead of gripping fingers 217, the sleeve 307' has a cup 395, see FIGURE 1, at its lower end adapted to overlie the finished cup on a mandrel J. A suction tube 396 is located at the rear of the conveyor chain 36 for enagement with a nozzle 397 projecting rearwardly from each transfer head, see FIGURE 1, which produces a vacuum in the suction cup 395 to draw the finished cup into the head. The suction line is completed from the suction tube 396 through a port opening in the sleeve 207' and the push rod 11' constitutes a valve to control the suction to the cup 395 and hold the finished cup during movement of the head of conveyor chute 41. A similar pressure tube 398 is positioned at the rear of the chain 36 adjacent the conveyor chute 41 for supplying compressed air to the conveying cup 395 to discharge the finished cup to the conveyor chute 41. Thus, the cups are doffed from the mandrel J before the latter move under the turret L' at the opposite end of the finishing unit G to begin another cup fabricating operation at the other side of the machine.

It will now be observed that the present invention provides an apparatus for making frusto-conical cups from cup blanks moving at a constant velocity through the apparatus and at a production rate limited only by the velocity at which the blanks are moved in a linear path. It will also be observed that the present invention provides an apparatus having juxtaposed mechanisms for producing the cup forming, transferring and finishing operations as they move at the same velocity and in juxtaposed relation. It also will be observed that the present invention utilizes a single finishing unit to fabricate cups from cup bodies supplied in separate lines from a plurality of separate body forming units. It will further be observed that the present invention provides a cup body forming unit which folds a flat blank into frusto-conical form as the blank moves in a linear path through the unit. It will further be observed that the present invention provides an apparatus for forming frusto-conical cup bodies and bottom inserts as they move at the same velocity in separate paths which converge in a finishing unit where the formed blanks are combined and joined to to form a finished cup. It will further be observed that the present invention provides an apparatus having mechanisms which move at the same constant velocity in endless paths juxtaposed to the path of movement of the cups being formed to perform the various blank forming and cup finishing operations to produce finished cups. It will still further be observed that the present invention provides an apparatus of the type indicated which is reliable in operation to produce frusto-conical cups at a higher rate of production than has heretofore been possible.

While a single embodiment of the invention is herein illustrated and described it will be understood that changes may be made in the construction and arrangement of elements in each of the different units without departing from the spirit or scope of the invention. Therefore, without limitation in this respect, the invention is defined by the following claims:

1. Apparatus for making cups from blanks of flat sheet material comprising a body forming unit having means for forming the blank into a frusto-conical cup body, a cup finishing unit having a mandrel mounted for movement bodily in a closed path, a bottom forming unit mounted for movement in a path juxtaposed with a portion of the path of the mandrel, means on said bottom forming unit for forming a bottom insert and applying it onto the mandrel as the mandrel and unit move in juxtaposed relationship, a transfer unit having a head movable in a path juxtaposed with the body forming unit and another portion of the path of the mandrel for transferring a formed body from the body forming unit onto the mandrel and over the bottom insert, a bottom attaching unit movable in a path juxtaposed with another portion of the path of the mandrel and having a tool for attaching the bottom insert to the cup body as the units move in juxtaposed relationship, and means for continuously moving the mandrel, bottom forming unit, transfer unit and bottom attaching unit in synchronism to successively position the bottom forming unit, the transfer head of the transfer unit and tool of the bottom attaching unit in juxtaposed relationship with the mandrel as the latter moves bodily at a constant velocity in its closed path on the cup finishing unit.

2. Apparatus for making cups from blanks of flat sheet material comprising a body forming unit having continuously moving means for forming a blank into a frusto-conical body, a cup finishing unit having a mandrel, means for continuously moving the mandrel bodily in a closed path having a circular end through the cup finishing unit, a continuously rotating turret overlying the circular end of the body finishing unit and having means for forming a blank into a bottom insert during its rotation and applying the insert onto the top of the mandrel, a continuously moving transfer unit having a transfer head for gripping and releasing a cup body and overlying a blank forming and mandrel moving means to transfer a formed cup body from the cup forming unit onto the mandrel and over the bottom insert as the mandrel moves in its path of movement away from the circular end, a continuously moving bottom attaching unit overlying the path of the mandrel and having a tool for attaching the bottom insert to the cup body, and means for driving the continuously moving elements of the plurality of units at the same velocity whereby to form and apply a bottom insert to the mandrel while the turret and mandrel move one over the other in superimposed relationship, transfer a cup body to the mandrel while the head of the transfer unit and mandrel move one over the other in superimposed relationship and attach the bottom insert to the cup body while the mandrel and bottom attaching unit move one over the other in superimposed relationship.

3. Apparatus for making cups from blanks of flat sheet material comprising a body forming unit having a conveyor for moving a blank in a linear path, stationary means cooperating with the conveyor for folding the sides of the blank into overlapping relation and sealing the seam to form a frusto-conical cup body as the blank moves through the unit, a cup finishing unit having a conveyor movable in a closed path and mounting a mandrel thereon, an intermediate conveyor having gripping and releasing means for transferring a formed cup body from the body forming unit to the mandrel on the conveyor of the cup finishing unit, a conveyor movable in a path juxtaposed with a portion of the conveyor mounting the mandrel and having a bottom forming means for forming a bottom insert and applying it to the mandrel, and a conveyor mounting a bottom attaching means and movable in a path juxtaposed with a portion of the path of the conveyor mounting the mandrel, and means for driving the conveyors at the same velocity to separately form a cup body and bottom insert, successively apply the bottom insert and formed cup body on the mandrel and attach the bottom insert to the cup body as the mandrel moves at a constant velocity through its closed path.

4. Apparatus for making cups from blanks of flat sheet material comprising a body forming unit having continuously moving means for advancing successive blanks and forming the blanks into frusto-conical cup bodies, a cup finishing unit having a plurality of spaced mandrels mounted for continuous movement bodily in a closed path, a plurality of bottom insert forming mechanisms mounted for continuous movement in a closed path juxtaposed with a portion of the path of the mandrels and spaced so that each cooperates with a mandrel during movement in juxtaposed paths, each mechanism having means for forming a bottom insert and applying it to the top of a mandrel, a transfer unit having a plurality of gripping and releasing heads mounted for continuous movement in a closed path juxtaposed with portions of the paths of the body forming unit and mandrels for transferring formed bodies from the body forming unit to successive mandrels on the cup finishing unit, a plurality of successive tools mounted for continuous movement in a path juxtaposed with another portion of the path of the mandrels so that each tool cooperates with a mandrel for attaching the bottom insert to the cup body thereon, and means for moving the mandrels, bottom forming insert mechanisms, transfer heads and successive tools in timed relationship to the movement of successive blanks from the body forming unit to form a cup on each mandrel of the cup finishing unit.

5. Apparatus for making cups from blanks of flat sheet material comprising a conveyor having means for gripping and advancing successive blanks, a conveyor having mounting means for conveying formed cup bodies, a third conveyor mounting successive bottom insert forming mechanisms and moving the mechanisms in juxtaposed relation to a portion of the second conveyor for forming bottom inserts and applying them to the mounting means on the latter, a fourth conveyor having handling elements for transferring formed cup bodies from the gripping means of the first conveyor to the mounting means on the second conveyor, a fifth conveyor mounting a plurality of successive bottom attaching tools for movement in juxtaposed relation to another portion of the second conveyor, means for driving all of the conveyors to move the operating elements thereon at the same velocity, and means cooperating with each conveyor for forming cup bodies and operating the blank gripping means, bottom forming and inserting means, body transfer elements, and bottom attaching means during movement by its conveyor.

6. Apparatus for making cups from blanks of flat sheet material comprising a body forming unit having a continuously moving conveyor for moving a blank in a linear path, stationary means cooperating with the conveyor for folding the blank to form a frusto-conical cup body as the blank moves through the unit, a cup finishing unit having a continuously moving conveyor movable in a closed path and mounting a mandrel thereon, a continuously moving conveyor movable in a path juxtaposed with a portion of the conveyor mounting the mandrel and having a bottom forming means for forming a bottom insert and applying it to the mandrel, a continuously moving intermediate conveyor having means for transferring a formed cup body from the body forming unit to the mandrel on the conveyor of the cup finishing unit, said mandrel having parts relatively movable in a direction at right angles to its path of movement, a presser plate mounted for movement toward the mandrel, means for moving the presser plate to depress the movable part of the mandrel for forcing a formed cup body over the bottom insert on the mandrel, a die plate at the sides of the movable part of the mandrel for rolling the edge of the formed cup body as it is depressed by the presser plate, a continuously moving conveyor mounting a bottom attaching means and movable in a path juxtaposed with a portion of the path of the conveyor mounting the mandrel for attaching the bottom insert to the formed body, and means for driving all of said conveyors to bodily move operating elements thereon at the same velocity.

7. Apparatus for making cups from blanks of flat sheet material comprising a body forming unit having a continuously moving conveyor for advancing blanks of flat sheet material successively in a linear path therethrough, means for folding each blank to form a frusto-conical cup body as it moves through the unit, a cup finishing unit having a plurality of mandrels mounted for continuous movement in succession through a closed path having circular ends, a bottom forming unit having a plurality of bottom forming elements continuously movable in a closed path juxtaposed with a portion of the path of the mandrels, means on said bottom forming unit for forming a bottom insert and applying it to the mandrel, a continuously movable transfer unit having a plurality of transfer elements movable in a closed path juxtaposed with another portion of the path of the mandrels for transferring formed cup bodies from the body forming unit onto each mandrel and over the bottom insert thereon, a bottom attaching unit having a plurality of tools for attaching the bottom insert to the cup body and continuously movable in a closed path juxtaposed with another portion of the path of the mandrels, means for moving the transfer elements, mandrels, bottom forming elements and bottom attaching tools in their respective paths in timed relation to the movement of cup bodies from the body forming unit, and means operated by the relative movement of the mandrel, transfer elements and the bottom forming and bottom attaching units in their respective paths for forming bottom inserts applying them to the cup body and attaching the bottom inserts to the cup bodies.

8. Apparatus for making paper cups from blanks comprising a body forming unit having means for forming successive blanks into frusto-conical cup bodies, a cup finishing unit, a transfer unit for transferring formed cup bodies from the body forming unit to the cup finishing unit, said cup finishing unit having pedestals at opposite ends, a sprocket on each pedestal, an endless chain conveyor mounted on said sprockets, a plurality of successive mandrels mounted on links of the chain conveyors for movement in a closed path around the sprockets, a turret mounted on one of the pedestals above the sprocket and connected to rotate with the sprocket, bottom insert forming heads mounted on the turret for movement therewith and having means overlying each mandrel as it passes under the turret for forming a bottom insert and applying it to the mandrel, a transfer unit having a series of transfer elements movable in a path overlying portions of the body forming unit and path of the mandrels between the sprockets for transferring a formed body from the body forming unit onto each mandrel and over the bottom insert thereon, a bottom attaching unit having spaced pedestals within the chain conveyor for the mandrels, sprockets on the spaced pedestals, a conveyor chain mounted on said sprockets and overlying a portion of the chain conveyor for the mandrels and having an attaching tool for each mandrel, and driving means for driving the turrets and chain conveyors for the mandrels and attaching tools at the same velocity whereby the bottom insert forming heads and attaching tools move in superimposed relation to successive mandrels.

9. Apparatus for making cups comprising a central unit, means for mounting successive mandrels for movement in a closed path around the periphery of the central unit, means at each end of the central unit for applying cup bottom inserts having a peripheral flange on the top of each mandrel, means adjacent each end of the central unit for applying frusto-conical cup bodies on each mandrel and over the bottom insert, means at each side of the central unit for attaching the end of the cup wall to the peripheral flange of the bottom insert on each mandrel, means adjacent the opposite end of the unit for doffing the formed cups from the mandrels, means for continuously moving the mandrels in the closed path around the unit at constant velocity while the blanks are applied, attached to each other and the finished cups doffed from the mandrels whereby to simultaneously produce cups in two separate lines at opposite sides of the central unit while on the same mandrels as they travel in opposite directions.

10. Apparatus for making cups from blanks of flat sheet sheet stock comprising a central unit having a plurality of mandrels thereon, means for mounting the mandrels on the central unit for movement in a closed path having circular ends, a turret at each end of the central unit having a plurality of bottom forming mechanisms overlying the mandrels as they move around the circular ends of their closed path of movement, each mechanism forming a bottom insert and applying it to the top of a mandrel, a body forming unit at each end of the central unit and having means for forming successive blanks into frusto-conical cup bodies, a transfer unit between each body forming unit and the central unit and having elements movable in a path juxtaposed to a portion of the path of movement of the mandrels immediately adjacent the circular end portion at opposite sides of the central unit for transferring successive cup bodies onto the mandrels, a bottom attaching unit having a plurality of tools movable in a path juxtaposed with the path of movement of the mandrels beyond the transfer unit at opposite sides of the central unit for attaching the bottom insert to each cup body a each side of the central unit, and a doffing mechanism at each side of the central unit overlying the path of the mandrels beyond the bottom attaching unit to remove finished cups from the mandrels.

11. Apparatus for making cups from blanks of flat sheet stock comprising a plurality of body forming units each having a conveyor for advancing successive blanks in a linear path through its unit, stationary elements in each unit cooperating with the conveyor to fold the blanks as they move through the units and form frusto-conical cup bodies, a central unit positioned between said body forming units and having means mounting a plurality of mandrels for movement through successive stations in a path having circular ends, a turret at each end of the central unit having a plurality of bottom forming elements corresponding with and overlying the mandrels at stations at the circular ends of the center unit, each of said bottom forming elements forming a bottom insert and transferring it to a mandrel as the latter moves through the end stations, transfer units having transfer elements corresponding to the spacing to the mandrels and movable in paths juxtaposed with the path of the mandrels at stations beyond the circular end station for transferring cup bodies from the body forming units to the successive mandrels over the bottom insert thereon, means for mounting a plurality of bottom attaching tools for movement in paths juxtaposed with the mandrels at stations at opposite sides of the central unit beyond the transfer stations for attaching the bottom insert to each cup body, and a doffing mechanism at each side of the central unit between the attaching stations and bottom inserting stations for doffing finished cups from the mandrels at both sides of the central unit.

12. Apparatus for making cups in accordance with claim 11 in which the means mounting the mandrels and bottom attaching tools are chain conveyors arranged one over the other, sprockets for the chain conveyors and means for driving the separate chain conveyors at the same linear velocity.

13. Apparatus for making paper cups in accordance with claim 12 in which the doffing means comprises means overlying each mandrel for removing a cup therefrom and a conveyor for receiving the doffed cups.

14. Apparatus for making cups in accordance with claim 13 in which the cup finishing unit comprises means for moving each cup body downwardly, and a die plate underlying the cup body and having a circular groove for forming a rolled edge on the cup body as it moves downwardly.

15. Apparatus for making cups in accordance with claim 11 in which the means on the central unit for mounting the mandrels is an endless chain of connected links, a sprocket at each end of the unit, and a mandrel mounted on each link of the chain.

16. Apparatus for making cups in accordance with claim 15 in which the means for mounting the plurality of bottom attaching tools is an endless chain of connected links overlying the chain for mounting the mandrels, sprockets on the unit intermediate its ends for mounting the chain, and an attaching tool mounted on each link of the chain.

17. Apparatus for making cups in accordance with claim 16 in which a driving means is connected to drive the chains mounting the mandrels and bottom attaching tools at the same linear velocity so that an attaching tool on a link of the upper chain overlies a mandrel on a link on the lower chain.

18. Apparatus for making cups in accordance with claim 17 including means for relatively rotating the bottom attaching tool and mandrel for attaching a bottom insert to a cup body.

19. Apparatus for making cups in accordance with claim 18 in which the cup body and bottom insert have overlying edge portions, and each bottom attaching tool on a link of the upper chain having means for crimping the edge portion of the cup body over the flange on the bottom insert and knurling the crimped flanges, and means operated by the movement of the tool by its chain for bodily moving the tool into operative position.

20. Apparatus for making frusto-conical cup bodies from blanks of flat sheet stock comprising a conveyor for engaging blanks centrally and advancing the blanks successively in a linear path, stationary elements for folding the blanks to frusto-conical form as they are advanced by the conveyor, a stationary element having offset vertical surfaces engaged by the edges of the folded blanks to control the overlap of the edge portions and the frusto-conical shape of the body being formed, means for applying adhesive to the overlapping side portion of the blank as it is advanced by the conveyor, an anvil over which the overlapping portions of the blank pass, and a roller for pressing the overlapped portions of the blank against the anvil as they pass therebetween.

21. Apparatus for making frusto-conical cup bodies from blanks of flat sheet stock comprising a magazine for mounting a plurality of blanks in superimposed relation, reciprocating means for feeding blanks successively from the magazine in a linear path, a conveyor chain having grippers for engaging the rearward edge portion of a blank centrally thereof, means for guiding the chain to move the grippers in a path intercepting the linear path of the blanks as they are advanced by the reciprocating means and then advancing the blank in the same linear path, stationary elements for folding the blank to tubular form as it is advanced by the conveyor, adhesive applying means for applying adhesive to the side of the blank adjacent one edge as it is advanced by the conveyor, and a common operating means for driving the blank feeding means and conveyor for positioning the grippers on the chain to overlie the rearward edge portion of a blank advanced by the feeding means, and means for operating the grippers to grip the blank which it overlies.

22. Apparatus for making frusto-conical cup bodies in accordance with claim 21 in which the conveyor chain is mounted on a sprocket at the rear of the blank feeding means for movement upwardly in a circular path and then forwardly in a linear path intercepting the path of the blanks, and the common operating means for the blank feeding means and conveyor advance a blank and gripper at the same velocity to position a gripper at the rearward edge portion of a blank during the movement of the parts in intercepting paths.

23. Apparatus for making frusto-conical cup bodies in accordance with claim 21 in which the feeding means comprises a gate adjacent the magazine which permits the passage of a single blank only, a reciprocating shuttle having means for picking a single blank from the bottom of the magazine and advancing it through the gate, and opposed rollers at the opposite side of the gate for advancing blanks from the shuttle into position for engagement by a gripper.

24. Apparatus for making frusto-conical cup bodies in accordance with claim 23 in which the blank feeding means comprises a shaft having an eccentric thereon, a link connecting the eccentric and shuttle to reciprocate the shuttle, shafts mounting the feed rolls, gearing connecting the shaft for the eccentric and shafts for the feed rolls including a shaft mounting the sprocket for the conveyor chain whereby to drive the shuttle, feed rolls and chain in timed relation to position a clamp to overlie the rearward edge portions of each blank as it is advanced by the shuttle and feed rolls.

25. Apparatus for making cup bodies in accordance with claim 20 in which the adhesive applying means comprises a feed roll for applying adhesive to successive blanks and driving means for driving the periphery of the adhesive applying roll at the same speed as the blank advanced by the conveyor chain.

26. Apparatus for making frusto-conical cup bodies in accordance with claim 20 comprising means for driving the pressure applying rolls to produce a peripheral speed the same as the blank advanced by the conveyor chain.

27. Apparatus for making frusto-conical cup bodies from blanks of flat sheet stock of a shape to be folded to frusto-conical form comprising a conveyor having a gripper mounted to rock thereon, said gripper gripping the rearward edge of a blank and moving the blank through a linear path on the conveyor, forming means at the sides of the conveyor for folding the sides of the blank toward each other into overlapping relationship to form a frusto-conical cup body with a longitudinal seam, an anvil having parallel vertical surfaces engaged by the edges of the blanks to control the overlap of the edges of each blank and a horizontal surface over which the overlapping edges of the blanks move as they are advanced by the grippers, and means cooperating with the gripper as it is moved by the conveyor for rocking the gripper to position the blank at an angle to its linear path of movement whereby to position the seam of the overlapping edges of the folded blank in the plane of the horizontal surface of the anvil.

28. Apparatus for making frusto-conical cup bodies from blanks on flat sheet stock of a shape to be folded to frusto-conical form comprising a chain conveyor having a plurality of successive grippers mounted to rock thereon, means for feeding blanks to successive grippers, each gripper having jaws for gripping the rearward end of the blank and moving the blank through a linear path, blank forming means including an anvil having a flat horizontal surface, guiding means on the anvil and at the sides of the gripper for folding the sides of the blank toward each other into overlapping relationship to form a cup body of frusto-conical shape with overlapping edges forming a seam overlying the anvil, adhesive applying means cooperating with the anvil to apply adhesive to one edge portion of the folded blank, means cooperating with the anvil for pressing the overlapping edge portions of the seam to adhesively attach the edge portions at the seam, and means cooperating with the grippers as they are moved by the chain conveyor for rocking the grippers and positioning the blanks at an angle to the linear path of movement whereby the seam of overlapping edge portions of the folded blank is positioned horizontally on the horizontal flat portion of the anvil.

29. Apparatus for making frusto-conical cup bodies in accordance with claim 28 in which the means for rocking grippers is a cam track, and each gripper having an arm with a cam follower engaging the cam track for rocking the gripper and blank at an angle to its linear path of movement.

30. Apparatus for making frusto-conical cup bodies in accordance with claim 29 in which the cam track has a section for rocking the gripper to position the blank horizontally, a section for rocking the gripper to position the blank at an angle to its linear path of movement equal to twice the angle of the wall of formed cup body and a section for rocking the formed cup body at substantially right angles to its linear path of movement.

31. Apparatus for making frusto-conical cup bodies in accordance with claim 28 comprising a table having a slot therethrough, chain guides in the table at opposite sides of the slot, a cam track below one of the chain guides, and the chain conveyor comprising a plurality of chains, a drive shaft having sprockets for driving the chains in unison, the grippers being pivotally mounted between links of the chains and projecting upwardly through the slot in the table, and the arm depending from each gripper having a cam follower engaging the cam track for rocking the gripper as it is moved in a linear path by the chains.

32. Apparatus for making frusto-conical cup bodies in accordance with claim 28 in which each gripper comprises a body member having a surface forming one jaw, a flat plate cooperating with the body member and forming the other jaw, a pin extending from the flat plate through the body member, a spring acting between the pin and body member for moving the jaws toward each other, and a cam engaging the end of the pin during movement of the chain conveyor for moving the jaws away from each other.

33. Apparatus for making frusto-conical cup bodies in accordance with claim 32 in which the chain conveyor comprises a plurality of spaced chains, the body of each gripper being pivotally mounted between the chains and having a pinion gear thereon, and the depending arm being pivotally mounted between the chains and having a gear meshing with the pinion gear on the body member whereby to multiply the movement of the cam operated arm through the gearing to rock the gripper and blank through an angle of substantially 90°.

34. Apparatus for making cups from blanks of flat sheet stock comprising a body forming unit for forming successive blanks into frusto-conical cup bodies, means for moving the cup bodies in a linear path, a cup finishing unit having mandrels mounted for continuous movement in a linear path during at least a portion of their movement and a transfer unit comprising an endless conveyor mounted for continuous movement in a closed path and having relatively movable fingers for gripping and releasing cup bodies, said path of the conveyor being juxtaposed with a portion of the path of movement of the formed cup bodies in the body forming unit and juxtaposed with a portion of the path of movement of the mandrels, means operated by the movement of the conveyor for relatively moving the fingers to grip a cup body as they move adjacent the cup forming unit and release the cup body as they move adjacent the mandrel, and driving means for moving the conveyors for the transfer unit and mandrels of the finishing unit to position the gripping fingers adjacent a cup body of the body forming unit and adjacent a mandrel of the finishing unit.

35. Apparatus for making cups in accordance with claim 34 in which a plurality of sets of gripping fingers are mounted on the conveyor of the transfer unit in a number and spacing corresponding to the spacing of the mandrels to transfer cup bodies to successive mandrels.

36. Apparatus for making cups in accordance with claim 35 in which the fingers of each set are relatively movable for gripping and releasing a cup body, each set of gripping fingers being mounted for movement vertically into and out of the open top of a formed cup body, a cam track for moving the fingers of a set vertically as they move bodily with a conveyor, and means operated by the vertical movement of a set of fingers to move the fingers of a set relative to each other.

37. Apparatus for making cups in accordance with claim 36 in which the gripping fingers of each set are mounted on a vertically movable sleeve, said sleeve being slidable in a head on the conveyor, a plunger slidable in said sleeve, stationary cam tracks, and cam followers on the sleeve and plunger movable along the cam tracks for moving the sleeve to position the fingers over a formed body on the body forming unit and over a mandrel on the finishing unit and actuate the sleeve and plunger vertically to position the fingers in and remove the fingers from the open top of a formed cup body and spread and release the fingers whereby movement of the conveyor actuates the fingers of a set to grip and release a cup body.

38. Apparatus for making cup bodies in accordance with claim 34 in which means in the body forming unit moves formed cup bodies in a linear path in substantially upright position, the mandrels on the finishing unit move in a linear path in upright position and the conveyor of the transfer unit moves in a path parallel to the linear paths of the formed cup bodies of the mandrels, respectively.

39. Apparatus for applying bottom inserts to frusto-conical cup bodies comprising a continuously moving conveyor mounting a mandrel, a track for guiding the conveyor in a path having a continuously rotating circular portion, a turret overlying the circular portion of the track, a bottom insert forming mechanism mounted on and movable with the turret, driving means for the conveyor and turret to move the mandrel and bottom insert forming mechanism through the circular portion of the path of the conveyor in superimposed relation, and means for operating the bottom insert forming mechanism on the turret to form a bottom insert and apply it to the top of the mandrel during movement of the latter through the circular portion of its path to movement, means for mounting a frusto-conical cup body on the mandrel, and means for attaching the bottom insert to the frusto-conical cup body.

40. Apparatus for applying bottom inserts to frusto-conical cup bodies in accordance with claim 39 in which the driving means is connected to drive the conveyor and turret in unison, and said bottom insert forming mechanism being actuated during the movement of the turret and mandrel in the circular portion of its path of movement to form a bottom insert and apply the formed insert to the mandrel.

41. Apparatus for applying bottom inserts to frusto-conical cup bodies in accordance with claim 40 comprising means operated by the movement of the turret for actuating the mechanism to form a bottom insert and apply it to a mandrel.

42. Apparatus for applying bottom inserts to frusto-conical cup bodies in accordance with claim 41 in which the bottom insert forming mechanism comprises a forming die having a circular opening and a plunger for forcing a circular blank through the forming die to form a circular insert having a peripheral flange, and said mandrel having a circular recess underlying the plunger on the turret for receiving the formed insert.

43. Apparatus for applying bottom inserts to frusto-conical cup bodies in accordance with claim 42 comprising a magazine on the turret for receiving and holding a stack of the circular blanks, a reciprocating feed plate for feeding blanks over the forming die, and means for operating the reciprocating feed plate in timed relation to the operation of the plunger.

44. Apparatus for applying bottom inserts to frusto-conical cup bodies in accordance with claim 43 in which the turret is mounted for rotation on a stationary pedestal, cam tracks on the stationary pedestal, and cam followers operated by the cam track during rotation of the turret and connected to actuate the blank feeding means and plunger successively.

45. Apparatus for applying bottom inserts to frusto-conical bodies in accordance with claim 39 in which a plurality of mandrels are mounted on the conveyor in spaced relation, and a plurality of the bottom insert forming mechanism mounted on the turret in spaced relation corresponding to the spacing of the mandrels on the conveyor whereby bottom inserts are formed and applied to successive mandrels during the continuous movement of the conveyor and turret in the circular portion of their paths of movement.

46. Apparatus for applying bottom inserts to frusto-conical bodies in accordance with claim 45 in which the turret is mounted on a stationary pedestal, cam tracks on the stationary pedestals, and cam followers for each of the insert forming mechanism actuated by the cam tracks to form bottom inserts and apply them to the mandrels.

47. Apparatus for making cups comprising a mandrel mounted for movement in a closed path, driving means connected to continuously move said mandrel along said closed path at a constant velocity, bodily movable means at one station along said path for applying a circular cup bottom having a peripheral flange onto the top of the moving mandrel, bodily movable means at another station along the path for donning a frusto-conical cup body over the moving mandrel and the cup bottom mounted thereon, bodily movable means at a finishing station along the path for attaching the wall of the moving cup body to the flange of the cup bottom to complete the cup, and means at another station along the path for doffing the form cup from the moving mandrel.

48. Apparatus for making cups in accordance with claim 47 in which the means for mounting the mandrel is a conveyor, and the means for mounting the attaching means is a conveyor overlying a portion of the conveyor for the mandrel.

49. Apparatus for making cups in accordance with claim 47 in which the means for attaching the cup bottom to the wall of the cup body comprises a head having means for crimping the edge of the cup body over the flange of the cup bottom, a knurling means for knurling the crimped edge portion of the cup body and flange of the bottom insert, means for rotating the head to move the crimping and knurling means around the edge of the cup mounted on the mandrel, said knurling means comprising a tool mounted on the head for movement laterally thereof, means operated by the movement of the conveyor for moving the head vertically, and means operated by the vertical movement of the head for actuating the knurling tool laterally for engagement with the peripheral edges of the cup body and bottom insert.

50. Apparatus for making cups in accordance with claim 47 in which the mandrel is mounted for movement vertically, a grooved die plate underlying and mounted for movement with the mandrel, a presser plate overlying the mandrel at the finishing station and mounted for movement vertically, and means for actuating the presser plate to engage the lower edge of the cup body with the grooved die plate and roll and edge on the cup body.

51. Apparatus for making cups in accordance with claim 47 in which a plurality of spaced mandrels are mounted on the conveyor for moving mandrels successively through a closed path, said means at the first station applying bottom inserts to each successive mandrel, said means at another station donning a cup body having separate means to don cup bodies to successive mandrels, and means at the finishing station for attaching the wall of the moving cup body comprising a second conveyor overlying the mandrels and mounting separate means arranged in spaced relation corresponding to the spacing of the mandrels for attaching the wall of the cup body to the flange of the cup bottom.

52. Apparatus for making cups in accordance with claim 48 in which the conveyor for the mandrels moves in a closed path having circular ends and straight runs between the circular ends, the conveyor for the separate attaching means having circular ends and straight runs overlying the straight runs of the lower conveyor and located between the spaced ends thereof, and said apparatus having corresponding bottom applying, body donning, attaching and doffing stations at the opposite sides of the conveyors for simultaneously making cups at opposite sides of the machine.

53. Apparatus for making cups in accordance with claim 52 in which the conveyors are in the form of chains, a mandrel and attaching means mounted on corresponding links of each chain in superimposed relationship, a drive shaft positioned between the chains and having sprockets engaging each chain to advance each link of the chain simultaneously in unison.

54. Apparatus for making cups in accordance with claim 48 comprising spaced pedestals, sprockets mounted on each pedestal, the conveyor for mounting a mandrel comprising a chain mounted on said sprockets, pedestals positioned between the aforementioned pedestals, sprockets on the inner pedestals, the conveyor for the attaching means comprising a chain overlying the conveyor mounting the mandrel, a drive shaft positioned between the inner pedestals and the chains and having driving sprockets for engaging the chains to move the mandrel and attaching means simultaneously in superimposed relationship.

References Cited in the file of this patent
UNITED STATES PATENTS

| | | |
|---|---|---|
| 1,365,517 | Luellen et al. | Jan. 11, 1921 |
| 1,876,931 | Heywood et al. | Sept. 13, 1932 |
| 2,049,418 | Barbieri | Aug. 4, 1936 |
| 2,124,674 | Ray | July 26, 1938 |
| 2,173,859 | Piperoux | Sept. 26, 1939 |
| 2,364,523 | Ganzer | Dec. 5, 1944 |
| 2,546,621 | Wixon et al. | Mar. 27, 1951 |
| 2,764,919 | Molla | Oct. 2, 1956 |
| 2,931,276 | Zerlin | Apr. 5, 1960 |
| 2,936,168 | Mestre | May 10, 1960 |